United States Patent
Haga et al.

(10) Patent No.: US 8,304,055 B2
(45) Date of Patent: Nov. 6, 2012

(54) ANTI-GLARE FILM AND DISPLAY DEVICE

(75) Inventors: Yumi Haga, Miyagi (JP); Shinichi Matsumura, Miyagi (JP); Hitoshi Watanabe, Miyagi (JP); Tsutomu Nagahama, Miyagi (JP)

(73) Assignee: Sony Corporation, Tokyo (JP)

( * ) Notice: Subject to any disclaimer, the term of this patent is extended or adjusted under 35 U.S.C. 154(b) by 162 days.

(21) Appl. No.: 12/032,523

(22) Filed: Feb. 15, 2008

(65) Prior Publication Data

US 2008/0286527 A1    Nov. 20, 2008

(30) Foreign Application Priority Data

Feb. 21, 2007 (JP) .................. 2007-040369
Dec. 28, 2007 (JP) .................. 2007-341462

(51) Int. Cl.
*B32B 3/00* (2006.01)
*G02B 1/11* (2006.01)

(52) U.S. Cl. ......... 428/147; 428/220; 359/580; 359/601

(58) Field of Classification Search .................. 428/141, 428/143
See application file for complete search history.

(56) References Cited

U.S. PATENT DOCUMENTS

| | | | |
|---|---|---|---|
| 2005/0068628 A1* | 3/2005 | Masaki | 359/599 |
| 2005/0175796 A1* | 8/2005 | Nakamura et al. | 428/32.8 |
| 2005/0255291 A1 | 11/2005 | Iwata et al. | |
| 2006/0132922 A1 | 6/2006 | Takao et al. | |
| 2006/0152801 A1 | 7/2006 | Matsunaga | |
| 2007/0121211 A1 | 5/2007 | Watanabe et al. | |
| 2007/0177271 A1 | 8/2007 | Matsunaga | |
| 2008/0030675 A1* | 2/2008 | Dillon | 351/159 |

FOREIGN PATENT DOCUMENTS

| | | |
|---|---|---|
| EP | 1 478 034 | 11/2004 |
| JP | 3374299 | 11/2002 |
| JP | 2005-227407 | 4/2006 |
| JP | 2006-106224 | 4/2006 |
| JP | 3821956 | 6/2006 |
| JP | 2007-041495 | 2/2007 |
| JP | 2007-047722 | 2/2007 |
| JP | 2007-058162 | 3/2007 |
| JP | 2007-108724 | 4/2007 |
| JP | 2007-041533 | 9/2007 |
| JP | 2006-116805 | 11/2007 |
| WO | WO 2005/063484 | 7/2005 |
| WO | 2006/106757 | 10/2006 |

* cited by examiner

*Primary Examiner* — Maria Veronica Ewald
*Assistant Examiner* — Prashant J Khatri
(74) *Attorney, Agent, or Firm* — K&L Gates LLP

(57) ABSTRACT

An anti-glare film, a method for manufacturing the anti-glare film, and a display device provided with the anti-glare film are provided. The anti-glare film includes fine irregularities formed on a surface of the anti-glare film, and wherein arithmetic mean roughness Ra of a roughness curve of the surface is 0.05 to 0.5 micrometers, and root mean square slope RΔq is 0.003 to 0.05 micrometers.

12 Claims, 9 Drawing Sheets

ANTI-GLARE FILM AND DISPLAY DEVICE

CROSS-REFERENCE TO RELATED APPLICATIONS

The present application claims priority to Japanese Patent Application No. 2007-40369 filed in the Japanese Patent Office on Feb. 21, 2007 and Japanese Patent Application No. 2007-341462 filed in the Japanese Patent Office on Dec. 28, 2007, the entire contents of which are incorporated herein by reference.

BACKGROUND

The present application relates to an anti-glare film, a method of manufacturing the same, and a display device. More particularly, the present application relates to an anti-glare film used for a display surface of display devices such as liquid crystal display devices.

A technique of providing an anti-glare film on the display surface side has been adopted to display devices such as liquid crystal display devices, aiming at diffusing light on the film, to thereby impart anti-glare properties, or to reduce glare of external light due to reflection on the surface. A known anti-glare film is to impart anti-glare properties by providing fine irregularities formed on the surface.

FIG. 8 shows a configuration of a known anti-glare film 101. The anti-glare film 101 includes a base 111, and an anti-glare layer 112 provided on the base 111. The anti-glare layer 112 contains particles 113, wherein projection of the particles 113 out from the surface of the anti-glare layer 112 contributes to form fine irregularities on the surface. The anti-glare film 101 is formed by applying a coating composition containing particles 113 such as irregular-shaped silica particles or fine organic particles on the base 111, and the coating is then allowed to dry. In the anti-glare film having the above configuration, light incident upon the anti-glare layer 112 is scattered by the particles 113 projected out from the anti-glare layer 112, and whereby glare ascribable to reflection on the surface may be reduced.

The fine irregularities have been investigated, aiming at more effectively imparting the anti-glare properties to the anti-glare film. For example, for the purpose of preventing glare, Japanese Patent No. 3821956 (hereinafter referred to as "Patent Document 1") proposes selection of the center-line mean roughness and mean top-bottom distance of the fine irregularities to 0.08 to 0.5 micrometers, and 20 to 80 micrometers, respectively. Aiming at achieving a desirable level of anti-glare properties, Japanese Patent No. 3374299 (hereinafter referred to as "Patent Document 2") proposes provision of coarse irregularities and fine irregularities, while adjusting the center-line mean roughness Ra of the surface having these irregularities provided thereon to 0.1 to 1.0 µm, mean distance Sm to 20 to 130 µm, and further adjusting the center-line mean roughness Ra of the coarse irregularity to 0.5 to 1.5 µm, mean distance Sm to 100 to 300 µm, the center-line mean roughness Ra of the fine irregularity to 0.05 to 0.5 µm, and mean distance Sm to 20 to 70 µm.

SUMMARY

Any of the above-described proposals are, however, aimed at scattering light in wider angles, more specifically, that the fine irregularities of the surface has a fine periodicity, and that the shape of the surface contains sharp angular components, so that the whole screen of the display device may become whitish. That is, the contrast may be degraded.

One possible solution for this problem may be elongation of the periodicity of the fine irregularities of the surface. Such elongation of periodicity may, however, fail in preventing glare. In other words, contrast and anti-glare properties are contradictory properties, so that it is difficult to satisfy both properties at the same time.

It is therefore desirable to provide an anti-glare film capable of satisfying desirable levels of contrast and anti-glare properties at the same time, a method of manufacturing the same, and a display device.

After investigations, it has been found out that desirable levels of both of anti-glare properties and contrast may be satisfied at the same time, by making use of surface scattering by fine irregularities having a long and moderate periodicity and being properly adjusted in the angular components thereof, rather than making use of scattering on the surface of the individual particles projected out from the surface.

In accordance with a first embodiment, there is provided an anti-glare film having fine irregularities on the surface thereof, wherein arithmetic mean roughness Ra of a roughness curve of the surface is 0.05 to 0.5 µm, and root mean square slope RΔq is 0.003 to 0.05 µm.

In accordance with a second embodiment, there is provided to a method of manufacturing an anti-glare film which includes the step of forming fine irregularities on the surface of the anti-glare film by shape transfer method, sand blasting or Benard Cells forming method. The surface of the anti-glare film is arithmetic mean roughness Ra of a roughness curve of 0.05 to 0.5 µm, and root mean square slope RΔq of 0.003 to 0.05 µm.

In accordance with a third embodiment, there is provided a display device which includes: a display portion for displaying an image, and an anti-glare film provided on a display surface side of the display portion, in which the anti-glare film has fine irregularities on a surface thereof. The surface of the anti-glare film is arithmetic mean roughness Ra of a roughness curve of 0.05 to 0.5 µm, and root mean square slope RΔq of 0.003 to 0.05 µm.

From the viewpoint of readiness in manufacturing, a resin material composing the anti-glare layer in embodiments is preferably an ionizing radiation-curable resin curable by light or electron beam, or a thermosetting resin curable by heat, and most preferably a photosensitive resin curable by ultraviolet radiation.

According to an embodiment, the arithmetic mean roughness Ra of the roughness curve of the surface is adjusted to 0.05 to 0.5 µm, and the root mean square slope RΔq of the surface is adjusted to 0.003 to 0.05 µm, so that light may be scattered by virtue of such long and moderate periodicity and the adjusted angular components.

As has been described in the above, according to an embodiment, desirable levels of contrast and anti-glare properties, having been contradictory to each other, may be satisfied at the same time, by adjusting the fine irregularities of the surface, in particular, the angular components.

Additional features and advantages are described herein, and will be apparent from the following Detailed Description and the figures.

DETAILED DESCRIPTION

The present application will be described below in further detail with reference to the figures according to an embodiment.

(1) First Embodiment (1-1) Configuration of Liquid Crystal Display Device

Figure 1:
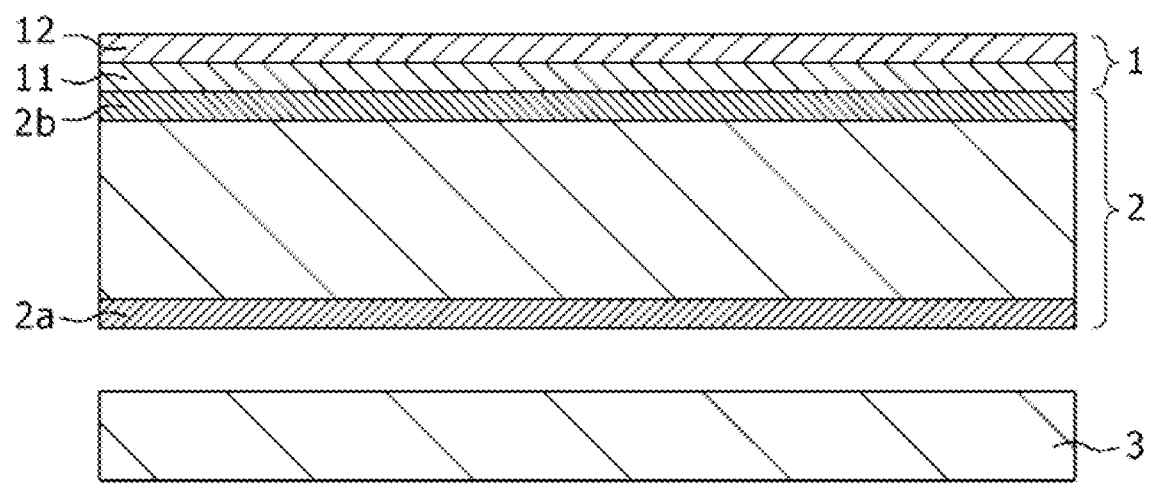
FIG. 1 is a schematic sectional view showing an exemplary configuration of a liquid crystal display device according to a first embodiment.

FIG. 1 shows an exemplary configuration of a liquid crystal display device according to a first embodiment. As shown in FIG. 1, the liquid crystal display device has a liquid crystal panel 2, and a light source 3 provided right under the liquid crystal panel 2. The liquid crystal panel 2 has an anti-glare film 1 on the display surface side of the liquid crystal panel.

The light source 3 is provided to supply light to the liquid crystal panel 2, and has a fluorescent lamp (FL), EL (electro luminescence) element, LED (light emitting diode) or the like. The liquid crystal panel 2 is provided to display information thereon, by modulating light supplied by the light source 3 in a spatial and time-dependent manner. On both surfaces of the liquid crystal panel 2, there are provided polarizing plates 2a, 2b. The polarizing plate 2a and the polarizing plate 2b allow only either one of orthogonal polarization components of the incident light to transmit therethrough, and intercept the other by absorption. The polarizing plate 2a and the polarizing plate 2b are provided, for example, such that the transmission axes thereof cross normal to each other.

In particular, the anti-glare film 1 is preferably combined with a back light based on the partial operation system (a system by which the back light is partially turned on and off, so as to deepen the black state). This is because a high-performance liquid crystal display device may be provided through deepening the black state and improving the contrast.

(1-2) Configuration of Anti-Glare Film

Figure 2:
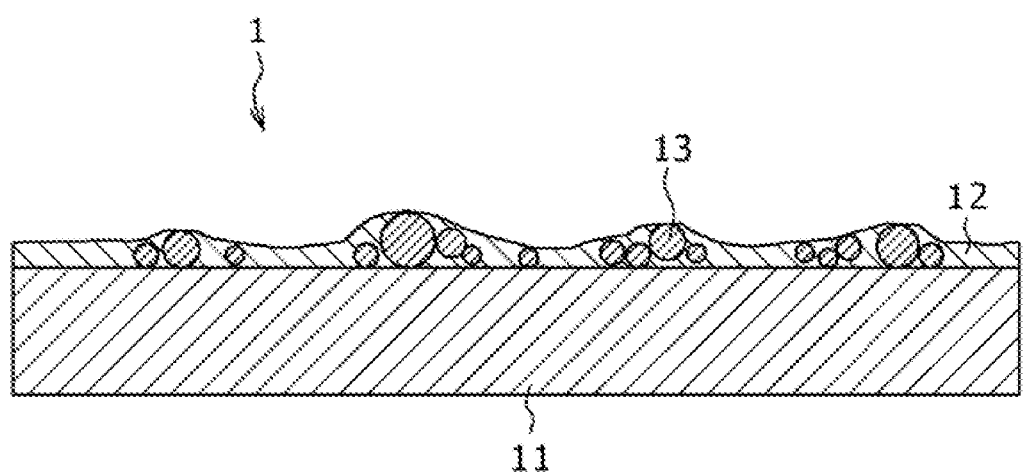
FIG. 2 is a schematic sectional view showing an exemplary configuration of an anti-glare film according to a first embodiment.

FIG. 2 shows an exemplary configuration of the anti-glare film 1 according to a first embodiment. As shown in FIG. 2, the anti-glare film 1 has a base 11, and an anti-glare layer 12 provided on the base 11. The anti-glare layer 12 contains particles 13, the surface of which is provided with fine irregularities formed by agglomeration of the particles 13 or the like. The anti-glare film 1 is preferably adoptable to various displays, in particular liquid crystal display devices, used for word processor, computer, television set, on-vehicle instrument panel and so forth.

The surface haze preferably falls in the range from 0 to 5%, and more preferably from 0 to 1%. Degree of white muddiness may be reduced if the surface haze is adjusted to 5% or smaller, and may hardly be sensible if it is adjusted to 1% or smaller. The surface haze herein represents a value obtained when scattering on the surface is detected, wherein larger surface haze means larger degree of white muddiness. On the other hand, internal haze is not specifically limited, and is determined depending on particles 12 contained in the anti-glare layer 12 or the like.

The total haze preferably falls in the range from 3 to 45%, more preferably from 3 to 40%, and most preferably from 3 to 30%. By such adjustment within the range from 3 to 45%, an appropriate level of anti-glare properties may be obtained without lowering sharpness of displayed images. More specifically, the total haze smaller than 3% may make it difficult to obtain a sufficient level of anti-glare properties, and the total haze exceeding 45% may degrade sharpness of displayed images. The total haze herein means sum of the surface haze and the internal haze.

The degree of white muddiness measured through a black glass placed on the back surface of the anti-glare film 1 is preferably 2.0 or smaller, and more preferably 1.5 or smaller. The contrast may be prevented from degrading if the degree of white muddiness is adjusted to 2.0 or smaller, and an excellent contrast may be achieved if it is adjusted to 1.1 or smaller.

The degree of white muddiness measured through a black acrylic sheet placed on the back surface of the anti-glare film 1 is preferably 1.5 or smaller, and more preferably 1.1 or smaller. The contrast may be prevented from degrading if the degree of white muddiness is adjusted to 1.5 or smaller, and an excellent contrast may be realized if it is adjusted to 1.1 or smaller.

(Base)

Materials composing the base 11 may be transparent plastic films. Transparent plastic films may be any known polymer films. The known polymer films may specifically be exemplified by triacetyl cellulose (TAC), polyester (TPEE), polyethylene terephthalate (PET), polyimide (PI), polyamide (PA), aramid, polyethylene (PE), polyacrylate (PAR), polyether sulfone, polysulfone, polypropylene (PP), diacetyl cellulose, polyvinyl chloride, acryl resin (PMMA), polycarbonate (PC), epoxy resin, urea resin, urethane resin, and melamine resin. Thickness of the base 11 preferably falls in the range from 38 μm to 100 μm from the viewpoint of productivity, but is not limited to the range.

(Anti-Glare Layer)

The anti-glare layer 12 contains the particles 13, and a resin. The anti-glare layer 12 may contain, as required, also additives such as photo stabilizer, ultraviolet absorber, antistatic agent, flame retarder, antioxidant and so forth. The particles 13 agglomerate mainly in the in-plane direction of the anti-glare layer 12, to thereby form two-dimensional agglomeration, wherein the agglomeration distribute over the surface of the anti-glare layer without being agglomerated. By virtue of this configuration, continuous and moderately-waved fine irregularities may be produced on the surface of the anti-glare layer, so that desirable levels of anti-glare properties and contrast may be satisfied at the same time. The term "the particles 13 agglomerate mainly in the in-plane direction of the anti-glare layer 12" as used herein means that (1) all particles 13 agglomerate in the in-plane direction without being overlapped with each other in the thickness-wise direction of the anti-glare layer 12, or (2) most of the particles 13 agglomerate in the in-plane direction, and the residual particles 13 overlap with each other in the thickness-wise direction only up to a degree not causative of increase in the degree of white muddiness (the degree of white muddiness measured through a black acrylic sheet placed on the back surface of the anti-glare film 1 does not exceed 1.5). Although it is ideal that all particles 13 form two-dimensional agglomeration, but a part of the particles 13 may independently remain without forming the agglomeration.

On the surface of the anti-glare layer 12, the agglomeration composed of the particles 13 are preferably covered with a resin. By covering the agglomeration, the particles 13 are prevented from projecting out from the anti-glare layer 12, production of large angular components ascribable to the curvature of the particles per se may consequently be prevented, and whereby the degree of white muddiness may be prevented from increasing. The term "the agglomeration are covered with a resin" as used herein means that (1) the agglomeration are completely covered with the resin, or (2) a part of the particles 13 composing the agglomeration are exposed without being covered with the resin, only up to a degree not causative of increase in the degree of white muddiness (the degree of white muddiness measured through a black acrylic sheet placed on the back surface of the anti-glare film 1 never exceeds 1.5).

Mean thickness of the anti-glare layer 12 preferably falls in the range from 3 to 30 µm, and more preferably from 4 to 15 µm. By the adjustment to this range, desirable levels of both of optical properties (anti-glare properties and high contrast) and physical characteristics may be satisfied at the same time. Arithmetic mean roughness Ra of the roughness curve observed on the surface of the anti-glare layer 12 is 0.05 to 0.5 µm. The arithmetic mean roughness Ra of the roughness curve smaller than 0.05 µm may degrade the anti-glare properties, and that exceeding 0.5 µm may degrade the contrast.

Figure 10:
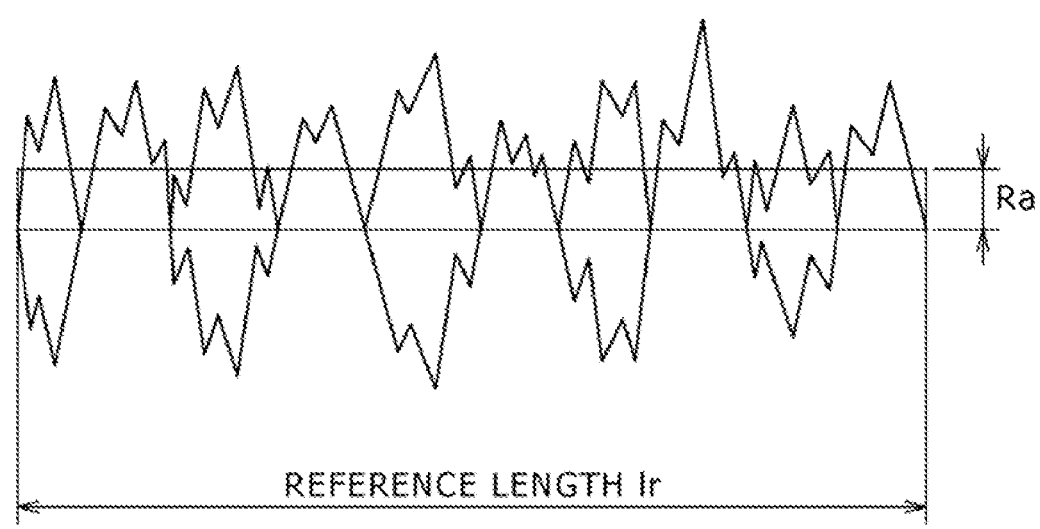
FIG. 10 is a schematic drawing explaining arithmetic mean roughness Ra.

FIG. 10 explains the arithmetic mean roughness Ra. As expressed by the equation below, the arithmetic mean roughness Ra is a mean value of an absolute value of Z(x) over a reference length, indicating that the surface becomes more smooth as the value decreases. The arithmetic mean roughness Ra smaller than 0.05 µm makes the surface of the anti-glare layer close to a mirror-like one, so that mirror-reflected components with respect to the incident light increases, and whereby the anti-glare properties is degraded. The upper limit of the arithmetic mean roughness Ra is not specifically limited so far as root mean square slope RΔ falls within the range from 0.003 to 0.05 µm, but our experiments revealed that also the root mean square slope RΔq increased concomitantly with increase in the arithmetic mean roughness Ra. As a consequence, the arithmetic mean roughness Ra exceeding 0.5 µm makes the root mean square slope RΔ exceeds 0.05 µm, and thereby the contrast degrades.

$$Ra = \frac{1}{lr} \int_0^{lr} |Z(x)| dx \quad (1)$$

Figure 3:
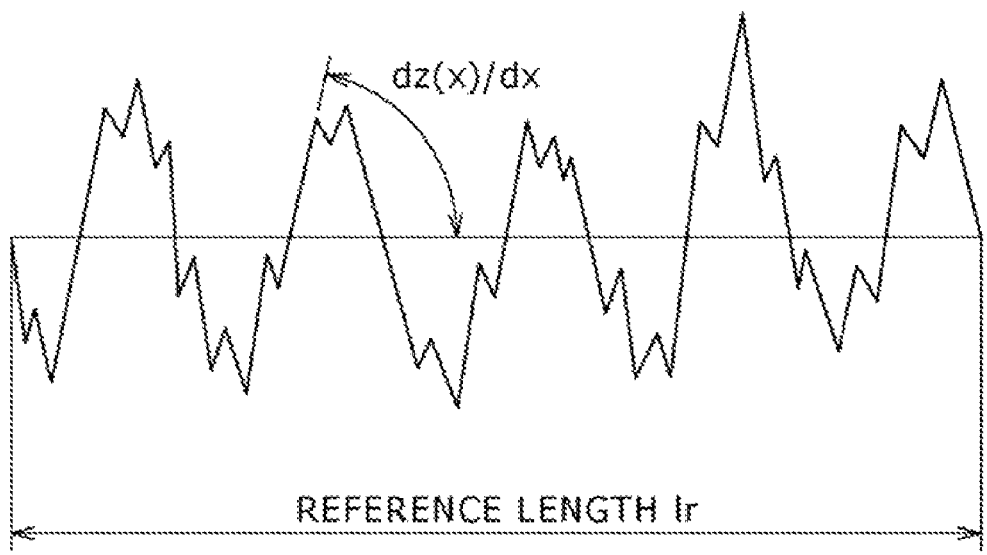
FIG. 3 is a schematic drawing explaining root mean square slope.

FIG. 3 is a schematic drawing explaining the root mean square slope. The root mean square roughness RΔq of the roughness curve is a parameter obtained by averaging the slope over a minute range, and is expressed by the equation (2) below.

RΔq (or Rdq): root mean square slope of roughness curve;
PΔq (or Pdq): root mean square slope of sectional curve; and
WΔq (or Wdq): root mean square slope of waviness curve,
root mean square of local slope dz/dx over a reference length:

$$R\Delta q, P\Delta q, W\Delta q = \sqrt{\frac{1}{lr} \int_0^{lr} \left(\frac{d}{dx} Z(x)\right)^2 dx} \quad (2)$$

The root mean square slope RΔq and optical properties (contrast (appearance of white muddiness) and anti-glare properties) correlate to each other. It is therefore possible to control the contrast and the anti-glare properties, by controlling the root mean square slope RΔq. More specifically, desirable levels of both of contrast and anti-glare properties may be satisfied at the same time, when the root mean square slope RΔq is 0.003 to 0.05 µm, and more preferably 0.005 to 0.03 µm.

The root mean square slope RΔq correlates to appearance of white muddiness. Because the root mean square slope RΔq is a mean value of slope over a minute region, the root mean square slope RΔq exceeding 0.05 µm, or, inclusion of steep slope in the angular components composing the surface may increase scattering on the surface, and whereby the appearance of white muddiness may be increased. As a consequence, the bright-field contrast may degrade. RΔq smaller than 0.003 µm makes the surface close to a mirror-like one, so that specular reflection components increases, and thereby the anti-glare properties distinctively degrades. As a surface profile parameter similar to the mean square slope RΔq, there is known mean angle of inclination θa (JIS B 0601-1994). The mean angle of inclination θa might be resemble thereto in terms of expressing the slope, whereas the above-described equation for determining the root mean square slope RΔq calculates a mean square of differential values over minute areas, so that larger angular components (largely contributive to the appearance of white muddiness) may be emphasized to a larger degree. As a consequence the root mean square slope RΔq is more sensitive in terms of degree of white muddiness, than the mean angle of inclination θa.

Figure 8:
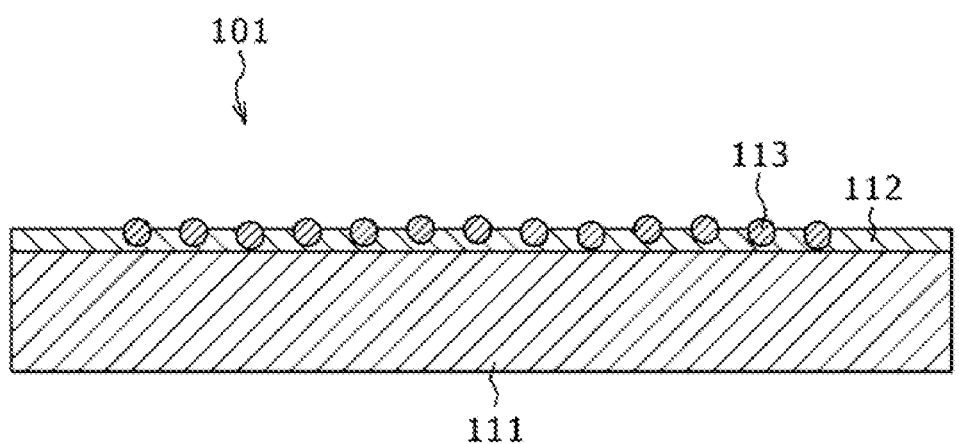
FIG. 8 is a schematic sectional view showing an exemplary configuration of a known anti-glare film.

The root mean square slope RΔq of the anti-glare film 1 of a first embodiment may be smaller than that of currently manufactured anti-glare films. Considering now that the root mean square slope RΔq is a parameter obtained by averaging the slope over the minute ranges, it may be understood that the fact indicates the follows. That is, the anti-glare film 1 of the first embodiment has, as shown in FIG. 2, a continuous and moderate fine irregularities, whereas the currently manufactured anti-glare film has, as shown in FIG. 8, fine irregularities containing sharp angular components. As a consequence, the anti-glare film 1 of the first embodiment can suppress scattering of light over a wide angular range so as to reduce the opacity change of the screen, whereas, the currently manufactured anti-glare film scatters light over a wide-angle range to thereby appear screen opacity. It is to be noted that, in the currently manufactured anti-glare film shown in FIG. 8, the fine irregularities is determined by the particle size and the degree of projection of particles.

The particles 13 used as a filler are spherical particles such as made of inorganic particles or organic particles. The mean particle size of the particles may preferably be 1 to 6 μm. By making adjustment in such range, a desired surface profile may be obtained.

Ratio R (=r/d×100) of mean particle size r of the particles 13 to the thickness d of the anti-glare layer 12 is preferably 40 to 75%, and more preferably 60 to 75%. In a first embodiment, a desired surface profile is obtained by making use of agglomeration of the particles 13 as nuclei, and by covering the nuclei with a resin. For this reason, the ratio R exceeding 100% results in exposure of the particles 13 out from the anti-glare layer 12, so that surface scattering may occur, and whereby the anti-glare film 1 becomes white muddy. Considering that the particles 13 has a certain particle size distribution, the particles 13 may contain particles larger than the mean particle size, so that the ratio R exceeding 75% results in exposure of such particles 13 larger than the mean particle size out from the anti-glare layer 12, to thereby increase the appearance of white muddiness in the anti-glare film 1. The ratio R is, therefore, preferably 75% or smaller. On the other hand, the ratio R smaller than 40% results in complete embedding of the particles 13 within the anti-glare layer 12, so as to smoothen the surface of the anti-glare layer 12. A desired surface profile may, therefore, be obtained when the ratio R falls in the range from 40 to 75%. The mean particle size is not specifically limited so far as the above-described numerical range may be satisfied, and may be obtained, for example, by using organic particles having a mean particle size of 1 to 10 μm.

Figure 9:
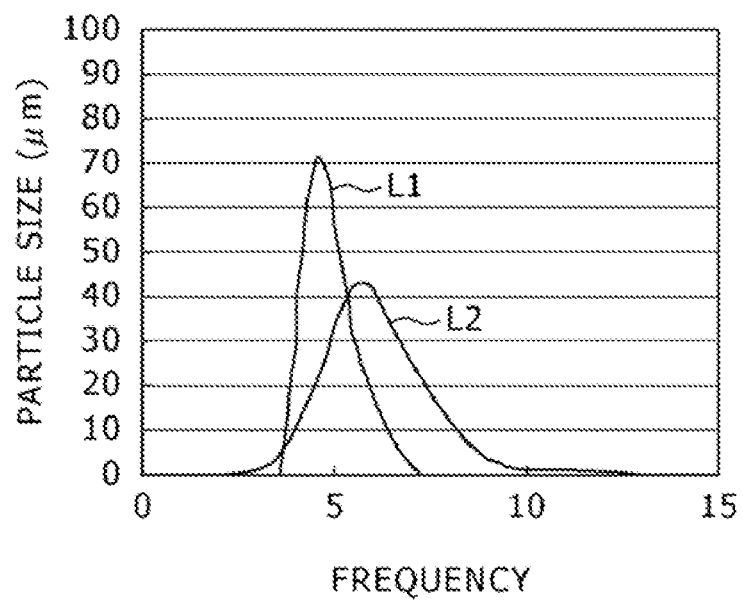
FIG. 9 is a graph showing an exemplary distribution of particle size.

FIG. 9 shows an exemplary particle size distribution of the particles 13. In FIG. 9, curve L1 represents a particle size distribution having a coefficient of variation of 8.4%, and curve L2 represents a particle size distribution having a coefficient of variation of 30%. The particles 13 used herein preferably has a certain particle size distribution as shown in FIG. 9, because fine irregularities characterized by a continuous and moderate waviness may be formed on the surface of the anti-glare layer 12, and whereby the opacity change may be reduced while keeping the anti-glare properties. The fine irregularities of the surface may be obtained, for example, by intentionally forming the agglomeration of the particles 13 with the aid of convection during drying, and by covering a most part or the entire portion of the agglomeration, each of which being assumed as one pile, with a curable resin, rather than by allowing the individual particles 13 to uniformly distribute.

In view of obtaining the anti-glare properties, the formation of continuous ridges agglomerations therebetween is desirable. From the viewpoint of forming the continuous ridges agglomerations therebetween, the particles 13 used herein preferably has a particle size distribution expressed by a coefficient of variation (standard deviation/mean particle size) of 20 to 40%. Use of mono-disperse particles tends to produce flat portions between the agglomerations, making the anti-glare properties poorer.

The organic particles used herein may be beads made of acryl resin (PMMA), polystyrene (PS), acryl-styrene copolymer, melamine resin, polycarbonate (PC) or the like. The organic particles are not specifically limited by properties such that whether they are cross-linked or not, instead allowing use of any particles made of plastics or the like.

The organic particles may have a certain particle size distribution. In order to obtain the surface profile of embodiments, for example, the agglomeration of the particles is intentionally formed with the aid of convection during drying, and a most part of the agglomeration, each of which is assumed as one pile, is covered with a curable resin to thereby obtain a desired shape, rather than allowing the individual particles to uniformly distribute. In view of obtaining the anti-glare properties, the formation of continuous ridges agglomerations formed therebetween is desirable, and this may be provided by using the particles having a particle size distribution expressed by a coefficient of variation (standard deviation/mean particle size) of 20 to 40%. On the contrary, use of mono-disperse particles tends to produce flat portions between the agglomerations, making the anti-glare properties poorer.

As has been described in the above, the anti-glare film according to embodiments is composed of agglomeration of particles, capable of suppressing scattering on the surface by virtue of a moderate waviness (mostly composed of small angular components), and providing the anti-glare properties. Exposure of the particles indicates that large angular components directly ascribable to the curvature of the particles per se, and the surface changes (white) opaque. In the first embodiment, a desirable shape may be obtained, for example, by covering a most part of the projections, while allowing only a part of which is exposed.

A desired surface profile may be produced also by using inorganic particles. The inorganic particles adoptable herein may be any of known ones, such as silica, calcium carbonate, barium sulfate and so forth, without any special limitations, and may appropriately be selectable taking difference in the refractive index with respect to a resin adopted herein into consideration.

The anti-static agent adoptable herein includes electro-conductive carbon, inorganic particles, inorganic fine particles, surfactant, and ionic liquid. These anti-static agents may be used independently or in combinations of two or more species thereof. Materials composing the inorganic particles and the inorganic fine particles may be exemplified by those mainly composed of electrically conductive metal oxides. The electro-conductive metal oxides adoptable herein may be exemplified by tin oxide, indium oxide, ATO (antimony-doped tin oxide), ITO (indium-doped tin oxide), and antimony-doped zinc oxide. For the case where the inorganic particles are used as the anti-static agent, at least a part of the particles 13 out of those composing the above-described agglomerations are preferably inorganic particles as the anti-static agent.

The surface activating agent may be exemplified by anionic or amphoteric compounds such as carboxylic acid compounds and phosphate salts, cationic compounds such as amine compounds and quaternary ammonium salts, nonionic compounds such as polyhydric alcohol esters of fatty acids and polyoxyethylene adducts, and polymer compounds such as polyacrylic acid derivatives. The ionic liquid is a molten salt which exists in a form of liquid at room temperature. The ionic liquid is preferably such as being compatible with solvents and resins, and as being kept in a state dissolved in resin, even after the solvent is vaporized in the process of drying described later. It is preferable that the ionic liquid has only a small effect of surface activation, and is not affective to convection and agglomeration of the particles even when added to the coating composition. More specifically, cation species composing ion pair may be exemplified by quaternary ammonium cation of aliphatic compound composed of nitrogen-containing onium, quaternary ammonium cation having nitrogen-containing heterocyclic structure, phosphonium cation composed of phosphorus-containing onium salt, and sulfonium cation composed of sulfur-containing onium.

Anion species composing ion pair may be exemplified by halogen anion, organic carboxyl group anion, and organic fluorine-containing anion. In particular, organic fluorine-containing anion such as tris(trifluoromethylsulfonyl)nitric acid is preferable, by virtue of its readiness in forming ion pair in a liquid form at normal temperature. The ionic liquid preferably contains no long-chain alkyl group in the ion pair. If the long-chain alkyl group may be contained in the ion pair, a large effect of surface activation would appear, and this may adversely affect agglomeration of the particles 13. Several species of the ionic liquid may be used in combination.

(1-3) Method of Manufacturing Anti-Glare Film

Next, an exemplary method of manufacturing the anti-glare film 1 configured as described in the above will be explained. The method of manufacturing the anti-glare film herein is applying photosensitive resin added with the particles on a transparent film which serves as a base, drying off the solvent contained in the resin, and then allowing the resin to cure.

(Preparation of Coating)

First, for example, a photosensitive resin as the ionizing radiation-curable resin and the particles are added to a solvent and mixed, to thereby obtain a coating composition having the particles 13 dispersed therein. In this process, photo stabilizer, ultraviolet absorber, anti-static agent, flame retarder, antioxidant or the like may further be added. Alternatively, silica particles or the like may further be added as a viscosity adjusting agent.

The solvent adoptable herein may be anything so far as they can dissolve therein the resin material adopted herein, they are excellent in wetting with the particles, and they are not causative of whitening of the base, and may be exemplified by organic solvent such as t-butanol. As the photosensitive resin, ultraviolet-curable resin curable by ultraviolet radiation may typically be used. The photosensitive resin adoptable herein may be exemplified by acrylate resins such as urethane acrylate, epoxy acrylate, polyester acrylate, polyether acrylate, and melamine acrylate. For example, the urethane acrylate resin may be obtained by allowing polyester polyol to react with an isocyanate monomer or with a prepolymer, and allowing the resultant product to react with a hydroxyl group-containing acrylate or methacrylate monomer. Characteristics after being cured may appropriately be selectable. For example, those excellent in transparency may be preferable in view of transmissivity of images, and those having large hardness may be preferable in view of scratch-proof property. The photosensitive resin is not specifically limited to ultra violet-curable resin, and may be anything so far as they have transparency, wherein those not causative of alteration in hue and energy of light transmitted therethrough, due to coloration and haze, may be preferable.

The photosensitive resin may appropriately be mixed with urethane resin, acryl resin, methacryl resin, styrene resin, melamine resin, cellulose-base resin, ionizing radiation-curable oligomer, and thermosetting oligomer, which are fixable at least by drying. By appropriately mixing these resins, the anti-glare layer 12 may be adjustable in the hardness and curling. The resins are not limited to those described in the above, and may preferably be those having ionizing radiation-susceptible groups such as acrylic double bond, or thermosetting groups such as —OH group.

As a photo-polymerization initiator contained in the photosensitive resin, benzophenone derivatives, acetophenone derivatives, anthraquinone derivatives and so forth may be adoptable independently or in combination. The photosensitive resin may further be added with any components, such as acrylic resin, capable of improving film formation, based on appropriate selection.

(Coating)

Next, the coating composition obtained as described above is applied to a base 11. The coating composition is applied so as to adjust the mean thickness after drying preferably to 3 to 30 µm, and more preferably to 4 to 15 µm. The thickness below the above-described numerical ranges may make it difficult to obtain a desired hardness, and the thickness exceeding the above-described numerical ranges may cause large curling. The coating thickness may be selectable, for example, by appropriately adjusting the solid content of the coating. Method of coating is not specifically limited, allowing adoption of any known methods of coating. The known methods of applying may be exemplified by micro-gravure coating, wire bar coating, direct gravure coating, die coating, dipping, spray coating, reverse roll coating, curtain coating, comma coating, knife coating and spin coating.

(Drying and Curing)

The anti-glare layer 12 is obtained by drying and curing the coating composition after coating. In this process, fine irregularities having a longer periodicity and more moderate slope (that is, the root mean square slope $R\Delta q$ is appropriately small) as compared with those in currently manufactured one is formed on the surface of the anti-glare layer 12. Method of forming this sort of fine irregularities may be exemplified by Benard Cells forming method. By the Benard Cells forming method herein, the agglomeration of the particles 13 are intentionally formed with the aid of convection during drying, rather than allowing the particles 13 to uniformly disperse, and a surface profile having a large periodicity is formed, which each of the agglomeration forms one pile. Temperature and time of drying may appropriately be determined depending on the boiling point of a solvent contained in the coating. In this case, the temperature and time of drying are preferably selected within the range not causative of deformation of the base 11 due to heat shrinkage, taking the heat resistance of the base 11 into consideration.

Specific processes of drying and curing will be explained below.

First, the coating composition applied on the base 11 is dried at a predetermined temperature, so as to produce convection in the coating composition, wherein by the convection the particles 13 are allowed to agglomerate mainly in the in-plane direction, so as to form two-dimensional agglomeration. By the process, the solvent vaporizes, and Benard Cells are formed on the surface of the coating. If three-dimensional agglomeration should be formed herein by stacking the particles 13 in the thickness-wise direction of the coated film, the anti-glare layer will have sharp angular components on the surface thereof, and whereby the appearance of white muddiness may undesirably increase.

The term "Benard Cells" as used herein means a convection phenomenon occurred in the coating composition in the process of drying off of the solvent, and a surface structure produced by the convection. All surface structures formed in the process of drying off of the solvent will be referred to as Benard Cells, allowing arbitrary geometry, and not limited to cyclic structure. Moreover, in embodiments, also cell structures slightly decayed by applying external force to Benard Cells, between the drying step and the curing step, may be referred to as "Benard Cells".

Degree of agglomeration of the particles 13 may be selectable by appropriately adjusting, for example, surface tension of the solvent, and surface energy of the particles 13. The temperature and time of drying may appropriately be selectable based on the boiling point of the solvent contained in the coating. In this case, the temperature and time of drying are preferably selected within the range not causative of deformation of the base 11 due to heat shrinkage, taking the heat resistance of the base 11 into consideration.

The resin contained in the coating composition preferably stays in the liquid state even after being dried. By this configuration, meniscus may be formed between Benard Cells. Therefore, fine irregularities showing a moderate waviness may be formed on the surface of coated film.

Conditions for drying are not specifically limited, allowing both of natural drying, and artificial drying based on adjustment of temperature and time of drying. For the case where the coating is blown with air for drying, it is preferable to avoid formation of wind ripple on the surface of the coated film. Formation of wind ripple tends to make it difficult to form the fine irregularities with a desired moderate waviness on the surface of the anti-glare layer, and may thereby make it difficult to satisfy desirable levels of anti-glare properties and contrast at the same time.

Next, the surface of the coating may be blown with air if necessary, so as to break the agglomerations, that is Benard Cells, to some degree.

Next, the resin dried on the base 11 is allowed to cure by irradiation of ionizing radiation or heating. By the process, a waviness with a large periodicity is formed, which one pile forms two-dimensional agglomeration. In other words, the fine irregularities having a longer periodicity and more moderate slope as compared with those in currently manufactured one is formed on the surface of the anti-glare layer 12.

The ionizing radiation adoptable herein may include electron beam, ultraviolet radiation, visible light, gamma ray and electron beam. Ultraviolet radiation is preferable from the viewpoint of production facility. Ultraviolet sources adoptable herein may be exemplified by ultra-high-pressure mercury lamp, high-pressure mercury lamp, low-pressure mercury lamp, carbon arc, xenon arc, and metal halide lamp. It is preferable that cumulative dose may appropriately be selected while considering curing characteristics of the resin, and suppression of yellowing of the resin and the base 11. Atmosphere of irradiation may be exemplified by air, or inert gas atmosphere such as nitrogen and argon.

The desired anti-glare film may be obtained in this way.

As has been described above, according to the first embodiment, the arithmetic mean roughness Ra of the roughness curve of the anti-glare layer 12 falls in the range from 0.05 to 0.5 µm, and the root mean square slope RΔq falls in the range from 0.003 to 0.05 µm, so that the fine irregularities of the anti-glare layer 12 has a long and moderate periodicity, and adjusted in the angular components. As a consequence, the anti-glare film is provided as having high contrast and excellent anti-glare properties.

(2) Second Embodiment

Next, a second embodiment will be explained. The above-described first embodiment dealt with the case where the fine irregularities is given by the particles 13 to the surface of the anti-glare layer 12, whereas the second embodiment will deal with the case where the fine irregularities is given to the surface of the anti-glare layer 12 by shape transfer.

(2-1) Configuration of Anti-Glare Film

Figure 4:
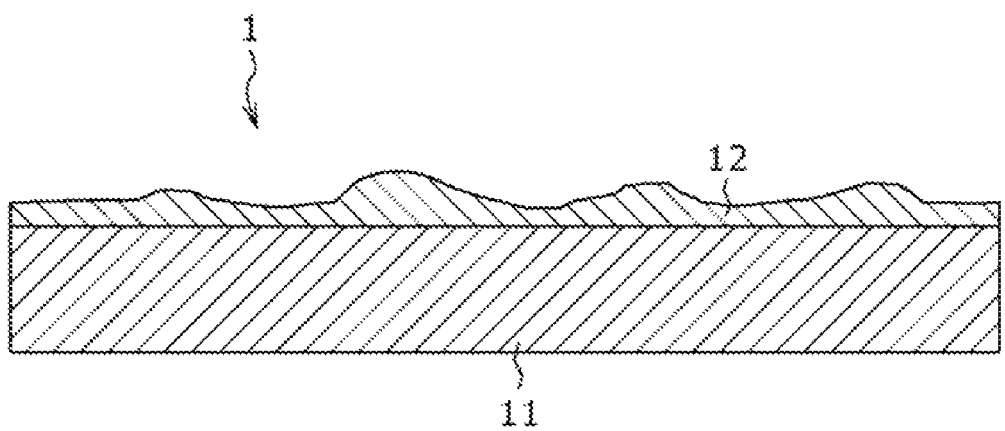
FIG. 4 is a schematic sectional view showing an exemplary configuration of an anti-glare film according to a second embodiment.

FIG. 4 shows an exemplary configuration of the anti-glare film 1 according to a second embodiment. As shown in FIG. 4, the anti-glare film 1 has a base 11, and the anti-glare layer 12 provided on the base 11. The second embodiment is same as the first embodiment, except that the anti-glare layer 12 does not contain the particles 13.

(2-2) Method of Manufacturing Anti-Glare Film

Next, an exemplary method of manufacturing the anti-glare film 1 configured as described above will be explained, referring to FIGS. 5A to 5E. The method of manufacturing the anti-glare film 1 is manufacturing a mother die by microprocessing, and obtaining desired fine irregularities by shape transfer.

(Process of Manufacturing Mother Die)

Figure 5A:
FIGS. 5A to 5E are schematic sectional views showing an exemplary method of manufacturing the anti-glare film according to a second embodiment.

First, a base to be processed is prepared. Shape of the base may be exemplified by substrate form, sheet form, film form, block form and the like. Materials for composing the base may be exemplified by plastic, metal, glass and so forth. Next, the base is processed, for example, by the mask imaging method using KrF excimer laser, to thereby pattern the surface of the base so as to form fine irregularities corresponded to the surface of the anti-glare layer 2. By this process, a mother die having fine irregularities reversed from that of the anti-glare layer 2 is obtained as shown in FIG. 5A.

(Process of Manufacturing Duplicate Master)

Figure 5B:

Next, for example, by electroless plating, an electrically conductive film is formed on the mother die 21 obtained as described above. The electrically conductive film herein is a metal film, for example, composed of a metal such as nickel. Next, the mother die 21 having the electrically conductive film formed thereon is attached to an electroforming apparatus, and a metal plated layer such as nickel plated layer is formed on the electrically conductive film, for example, by electro-plating. Thereafter, the metal plated layer is released from the mother die 21. A duplicate master 22 having fine irregularities reversed from that of the mother die 21 is obtained in this way as shown in FIG. 5B.

Figure 5C:

Next, a metal plated layer such as nickel plated layer is formed, for example, by electro-plating, on the fine irregularities of the duplicate master 22 obtained as described above. The metal plated layer is then released from the duplicate master 22. A duplicate master 23 having the same fine irregularities as that of the mother die 21 is obtained in this way as shown in FIG. 5C.

(Process of Manufacturing Anti-Glare Layer)

Next, a photosensitive resin such as ultraviolet-curable resin is poured onto the fine irregularities of the duplicate master 23 obtained as described above. The photosensitive resin for forming the anti-glare layer 12 adoptable herein may be similar to those used in the first embodiment. Although the photosensitive resin is not specifically added with particles since the fine irregularities of the anti-glare layer 12 is obtained by shape transfer, the particles may be added for the purpose of finely adjusting the haze value and surface profile.

Figure 5D:
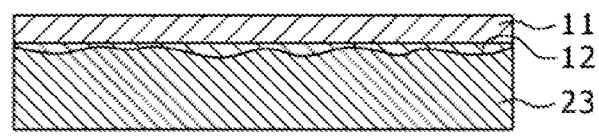
Figure 5E:
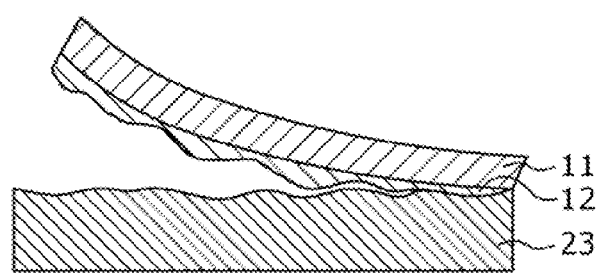

Next, as shown in FIG. 5D, the base 11 which serves as a support is placed on the duplicate master 23. The base 11 is then applied with force, for example, through a rubber roller, to thereby make the thickness of the photosensitive resin uniform. The photosensitive resin is then, for example, irradiated by light such as ultraviolet radiation from the base 11 side, for curing. The cured photosensitive resin is then released from the duplicate master 23 as shown in FIG. 5E. By this process, the anti-glare layer 12 is formed on one main surface of the base 11, and whereby a desired anti-glare film 1 is obtained.

In the second embodiment, same advantageous effects as those in the first embodiment may be obtained.

(3) Third Embodiment

(3-1) Configuration of Anti-Glare Film

Figure 11:
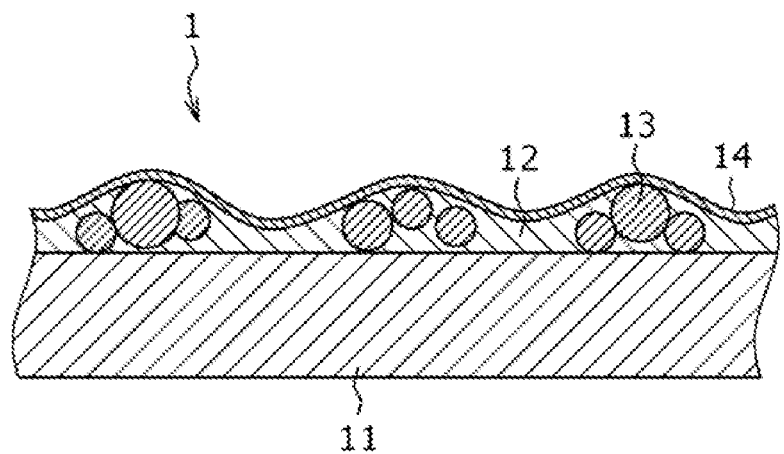
FIG. 11 is a schematic sectional view showing an exemplary configuration of an anti-glare film according to a third embodiment.

FIG. 11 shows an exemplary configuration of an anti-glare film of a third embodiment. As shown in FIG. 11, the anti-glare film 1 of the third embodiment differs from the above-described first embodiment in that a low refractive index layer 14 is additionally provided on the anti-glare layer 12. The base 11 and the anti-glare layer 12 are same as those in the first embodiment described above, so that they will be given with the same reference numerals, so as to avoid repetitive explanation.

As shown in FIG. 11, the low refractive index layer 14 is preferably provided conforming to the waviness of the surface of the anti-glare layer, and more preferably, together with a nearly uniform thickness, the surface of the anti-glare layer has a moderate waviness almost equivalent to the surface of the anti-glare layer. By this configuration, desirable levels of contrast and anti-glare properties may be satisfied at the same time even when the low refractive index layer 14 is provided. Although it is ideal that the low refractive index layer 14 has a nearly uniform thickness as described above, it is not always necessary for the low refractive index layer 14 to be provided over the entire region of the anti-glare layer 12, wherein a sufficient level of contrast may be obtained if the low refractive index layer is formed over a most part of the anti-glare layer 12 excluding the projected portions thereof, that is, over the portion which is relatively smooth and has a large reflectivity, in a nearly uniform manner.

Figure 12:
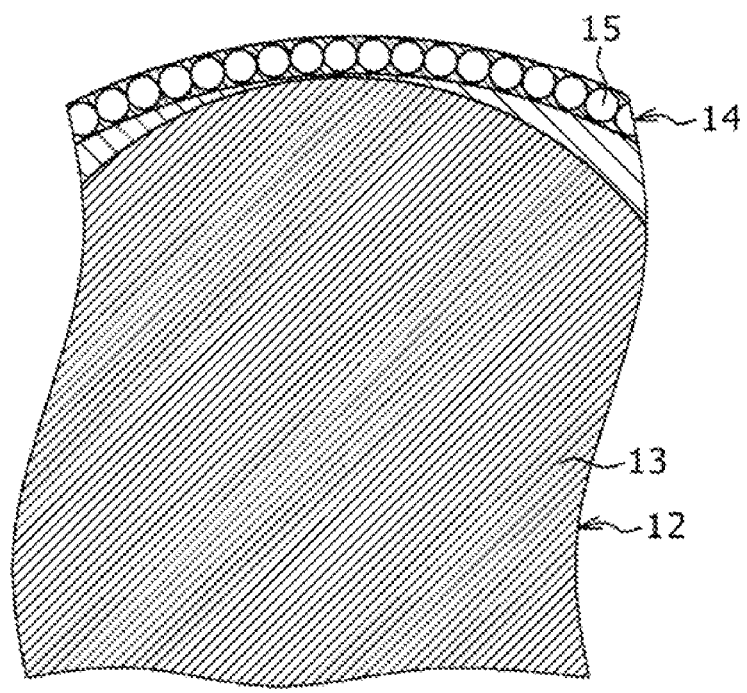
FIG. 12 is a schematic sectional view showing an exemplary configuration of a low refractive index layer provided to the anti-glare film according to a third embodiment.

FIG. 12 is a sectional view showing an enlarged view of the low refractive index layer 14 shown in FIG. 11. As shown in FIG. 11, the low refractive index layer 14, for example, contains a resin and hollow particles 15. The hollow particles 15 are preferably distributed over the entire surface of the anti-glare layer 12. The hollow particles 15 are preferably embedded in the low refractive index layer 14, and the embedded hollow particles 15 are preferably stacked by approximately two to three in the thickness-wise direction of the low refractive index layer 14, to thereby form a layer of the hollow particles 15.

(3-2) Method of Manufacturing Anti-Glare Film

Next, an exemplary method of manufacturing the anti-glare film of a third embodiment will be explained. The method of manufacturing the anti-glare film of the third embodiment is different from the first embodiment in that a step of forming the low refractive index layer is further provided after formation of the anti-glare layer. The paragraphs below will therefore explain only the step of forming the low refractive index layer.

(Preparation of Coating Composition)

First, the hollow particles 15, a resin, and a solvent are mixed typically using a stirrer such as disper, or a disperser such as a bead mill, to thereby prepare a coating composition. Additives such as photo-stabilizer, ultraviolet absorber, antistatic agent, flame retarder, antioxidant and so forth may be added if occasions demand.

The resin adoptable herein may be an ionizing radiation-curable resin curable by light or electron beam, or a thermo-setting resin curable by heat, used independently or in a mixed manner, wherein from the viewpoint of readiness in manufacturing, photosensitive resin curable by ultraviolet radiation is most preferable. The ionizing radiation-curable resin preferably contains multi-functional monomer up to an amount of 90% or more. The multi-functional monomers may be exemplified by esters of polyhydric alcohol and (meth) acrylic acid, and more specifically ethylene glycol di(meth)acrylate, 1,4-dicyclohexane diacrylate, pentaerythritol tetra(meth)acrylate, pentaerythritol tri(meth)acrylate, trimethylolpropane tri(meth)acrylate, trimethylolethane tri (meth)acrylate, dipentaerythritol tetra(meth)acrylate, dipentaerythritol penta(meth)acrylate, dipentaerythritol hexa(meth)acrylate, 1,2,3-cyclohexane tetramethacrylate, polyurethane polyacrylate, and polyester polyacrylate.

The hollow particles 15 may be exemplified by inorganic particles such as made of silica, alumina and so forth, and organic particles such as made of styrene, acryl and so forth, in which silica particles are particularly preferable. The hollow particles 15 internally contain air, so that the refractive index thereof is smaller than that of general particles. For example, silica particles have a refractive index of 1.46, whereas the refractive index of the hollow silica particles is 1.45 or smaller.

Mean particle size of the hollow particles 15 preferably falls in the range from 10 to 200 nm, and more preferably from 30 to 60 nm. If the mean particle size exceeds 200 nm, not ignorable as compared with wavelength of the visible light, light is scattered on the surface of the low refractive index layer 14. As a consequence, the transparency degrades, and the screen looks whitish. On the other hand, the mean particle size smaller than 10 nm may make the hollow particles 15 more likely to agglomerate. In view of improving affinity with the resin, the hollow particles 15 such as hollow silica particles preferably have, on the surface thereof, (meth) acryloyl groups polymerizable by ionizing radiation.

As the additives, for example, a modified silicon acrylate compound, more specifically, a compound having at least one or more organic groups in dimethylsilicon molecule may be used. Equivalent of organic group bound to dimethyl silicon is preferably 1630 g/mol or more. A method of measuring the equivalent of organic group adoptable herein may be such as calculating it from ratio of peak intensities of 1H in methyl group in dimethyl silicon molecule and 1H in the organic group, using nuclear magnetic resonance (NMR) method, The organic group may be exemplified by methacryl group, acryl group, mercapto group and so forth.

As the solvent, those capable of dissolving the resin to be adopted, but incapable of dissolving the anti-glare layer 12 laid thereunder, are preferable. This sort of solvents may be exemplified by organic solvents such as tertiary butanol, toluene, methyl ethyl ketone (MEK), isopropanol (IPA), methyl isobutyl ketone (MIBK) and so forth.

(Coating)

Next, the coating composition prepared as described in the above is spread on the anti-glare layer 12. Methods of coating may be exemplified by those using gravure coater, bar coater, die coater, knife coater, comma coater, spray coater, curtain coater and so forth. Methods of coating are not specifically limited, allowing any methods capable of uniformly forming a layer of a predetermined thickness.

(Drying and Curing)

Next, the coating composition coated onto the anti-glare layer 12 is dried and cured. By the process, the low refractive index layer 14a having moderate fine irregularities are formed on the anti-glare layer 12. Methods of drying and curing adoptable herein may be same as those in the process of manufacturing the anti-glare layer in the first embodiment described above.

The desired anti-glare film 1 may be obtained in this way.

According to a third embodiment further provided with the low refractive index layer 14 on the anti-glare layer 12, the reflectivity may further be reduced as compared with the first embodiment described above.

(4) Fourth Embodiment

Figure 13:
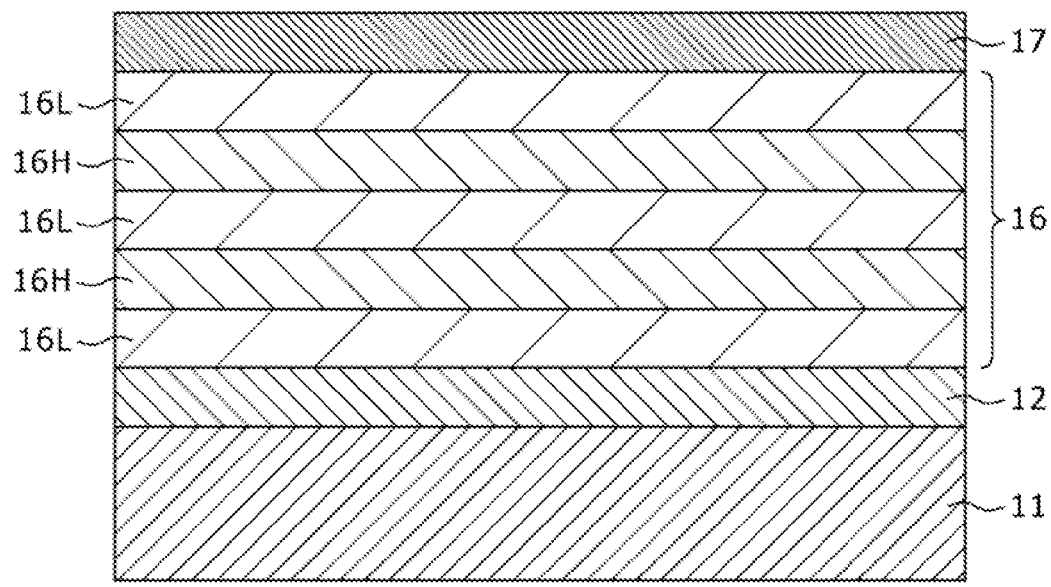
FIG. 13 is a schematic sectional view showing an exemplary configuration of an anti-glare film according to a fourth embodiment.

FIG. 13 shows an exemplary configuration of an anti-glare film of a fourth embodiment. As shown in FIG. 13, the antiglare film 1 differs from the third embodiment in that a multi-layered anti-reflective film is provided on the anti-glare layer 12. The base 11 and the anti-glare layer 12 are same as those in the third embodiment described above, so that they will be given with the same reference numerals, so as to avoid repetitive explanation.

The anti-reflective layer 16 is a stacked film containing low refractive index layers 16L and high refractive index layers 16H, wherein it is preferable to appropriately select the number of stacking of the low refractive index layers 16L and the high refractive index layers 16H depending on desired properties. Materials composing the low refractive index layers 16L adoptable herein may be exemplified by $SiO_x$, $SiO_2$, $Al_2O_3$ and mixtures of them, but not specifically limited thereto, allowing arbitrary selection from publicly-known, low refractive index materials depending on properties required for the low refractive index layer. Materials composing the high-refractive-index layers 16H adoptable herein may be exemplified by $TiO_2$, $Nb_2O_5$, $Ta_2O_5$, $WO_3$ and mixtures of them, but not specifically limited thereto, allowing arbitrary selection from publicly-known, high refractive index materials depending on properties required for the high refractive index layer 16H. Sputtering may preferably be adoptable as the method of forming the low refractive index layers 16L and the high refractive index layers 16H, but the method is not limited thereto.

Alternatively as shown in FIG. 13, an anti-stain layer 17 may further be provided on the multi-layered, anti-reflective layer, in view of suppressing adhesion of stain on the surface of the anti-glare film 1, if occasions demand. Fluorine-containing compounds may preferably be adoptable to the anti-glare layer 18, but not specifically limited thereto.

EXAMPLES

Paragraphs below will specifically explain embodiments based on Examples, without limiting embodiments to these Examples. Examples 1 to 5 and Examples 7 to 9 correspond to the first embodiment, and Example 6 corresponds to the second embodiment.

Example 1

First, materials listed in the coating composition below were mixed, and stirred using a magnetic stirrer for one hour, to thereby obtain a coating composition. Next, the obtained coating composition was applied using a bar coater on a TAC film (manufactured and sold by FUJIFILM Corporation) of 80 μm thick. The product was then dried in a drying oven at 80° C. for 2 minutes, and then ultraviolet radiation was irradiated at an energy of 500 $mJ/cm^2$, to thereby form the anti-glare layer having a dry thickness of 10 μm. The desired anti-glare film was obtained in this way.

<Coating Composition>

| | |
|---|---|
| Tetrafunctional urethane acryl oligomer | 100 parts by weight |
| Initiator Irgacure 184 | 5 parts by weight |
| Solvent t-butanol | 120 parts by weight |
| Crosslinkable styrene beads SBX6 (manufactured and sold by Sekisui Plastics Co., Ltd.) | 5 parts by weight |

Example 2

The anti-glare film was obtained similarly to as described in Example 1, except that the dry thickness of the anti-glare layer was adjusted to 8 μm.

Example 3

First, materials listed in the coating composition 1 below were mixed, and stirred using a magnetic stirrer for one hour, to thereby obtain a coating composition. Next, the obtained coating composition was applied using a bar coater on a TAC film (manufactured and sold by FUJIFILM Corporation) of 80 μm thick, and then dried in a drying oven at 80° C. for 2 minutes. Next, materials listed in the coating composition 2 below were mixed, and stirred using a magnetic stirrer for one hour, to thereby obtain a coating composition. Thus-obtained coating composition was then applied using a bar coater on the coating produced based on the coating composition 1, the coating was dried in a drying oven at 80° C. for 2 minutes, and irradiated with ultraviolet radiation at an energy of 500 $mJ/cm^2$, to thereby form a resin layer having a dry thickness of 7 μm. The desired anti-glare film was obtained in this way.

<Coating Composition 1>

| | |
|---|---|
| Tetrafunctional urethane acryl oligomer | 100 parts by weight |
| Initiator: Irgacure 184 | 5 parts by weight |
| Solvent: t-butanol | 120 parts by weight |
| Crosslinkable styrene beads SBX6 (from Sekisui Plastics Co., Ltd.) | 10 parts by weight |

<Coating Composition 2>

| | |
|---|---|
| Tetrafunctional urethane acryl oligomer | 100 parts by weight |
| Initiator: Irgacure 184 | 5 parts by weight |
| Acryl polyol-base polymer | 5 parts by weight |
| Solvent: t-butanol | 120 parts by weight |
| toluene | 6 parts by weight |
| ethyl acetate | 6 parts by weight |

Example 4

First, a coating composition was obtained similarly to as described in Example 1. Next, an anti-glare layer having a dry thickness of 9 μm was obtained similarly to as described in Example 1, except that thus-obtained coating composition was applied over a PET film (manufactured and sold by TOYOBO Co., Ltd., Cosmoshine A4300) of 100 μm thick.

Example 5

First, an anti-glare film was obtained similarly to as described in Example 1. Next, a fluorine (F)-containing polymer was applied by dipping on the resultant anti-glare film to as thick as 120 nm, and then cured. By this process, a low refractive index layer (anti-reflective coating) was formed on the anti-glare layer. The desired anti-glare film was obtained in this way.

Example 7

First, source materials listed in the coating compositions were respectively mixed, and a double-layered anti-glare film was manufactured according to the same technique as described in Example 3.

<Coating Composition 1>

| Tetrafunctional urethane acryl oligomer | 100 parts by weight |
|---|---|
| Initiator: Irgacure 184 | 5 parts by weight |
| Solvent: toluene | 120 parts by weight |
| Crosslinkable acryl beads MBX5 (from Sekisui Plastics Co., Ltd.) | 3 parts by weight |

<Coating Composition 2>

| Tetrafunctional urethane acryl oligomer | 100 parts by weight |
|---|---|
| Initiator: Irgacure 184 | 5 parts by weight |
| Acryl polyol-base polymer | 5 parts by weight |
| Solvent: t-butanol | 120 parts by weight |
| toluene | 6 parts by weight |
| ethyl acetate | 6 parts by weight |

Example 8

First, source materials listed in the coating composition below were mixed, and stirred using a magnetic stirrer for one hour, to thereby obtain a coating composition. Next, thus-obtained coating composition was applied using a bar coater on a TAC film (from FUJIFILM Corporation) of 80 μm thick. The product was then dried in a drying oven at 80° C. for 2 minutes, then ultraviolet radiation was irradiated at an energy of 500 mJ/cm$^2$, to thereby form the anti-glare layer having a dry thickness of 3 μm. The desired anti-glare film was obtained in this way.

<Coating Composition>

| Hexafunctionla urethane acryl oligomer | 100 parts by weight |
|---|---|
| Initiator: Irgacure 184 | 5 parts by weight |
| Solvent: toluene | 120 parts by weight |
| Crosslinkable acryl beads (particle size = 1.5 μm) | 3 parts by weight |

Example 9

First, source materials listed in the coating composition below were mixed, and stirred using a magnetic stirrer for 3 hours, to thereby obtain a coating composition. Next, thus-obtained coating composition was applied using a bar coater on a TAC film (manufactured and sold by FUJIFILM Corporation) of 80 μm thick. The product was then dried in a drying oven at 80° C. for 2 minutes, then ultraviolet radiation was irradiated at an energy of 500 mJ/cm$^2$, to thereby form the anti-glare layer having a dry thickness of 6 μm. The desired anti-glare film was obtained in this way.

<Coating Composition>

| Hexafunctional urethane acryl oligomer | 100 parts by weight |
|---|---|
| Initiator: Irgacure 184 | 5 parts by weight |
| Solvent: toluene | 120 parts by weight |
| Silica filler (particle size = 1.0 μm) | 10 parts by weight |

Comparative Example 1

An anti-glare film was obtained similarly to as described in Example 1, except that the dry thickness of the anti-glare layer was adjusted to 7 μm.

Comparative Example 2

First, source materials listed in the coating composition below were mixed, and stirred using a magnetic stirrer for one hour, to thereby obtain a coating composition. Next, thus-obtained coating composition was applied using a bar coater on a TAC film (manufactured and sold by FUJIFILM Corporation) of 80 μm thick. The product was then dried in a drying oven at 80° C. for 2 minutes, and then ultraviolet radiation was irradiated at an energy of 500 mJ/cm$^2$, to thereby form the anti-glare layer having a dry thickness of 4 μm. The desired anti-glare film was obtained in this way.

<Coating Composition>

| Tetrafunctional urethane acryl oligomer | 100 parts by weight |
|---|---|
| Initiator: Irgacure 184 | 5 parts by weight |
| Solvent: t-butanol | 120 parts by weight |
| Crosslinkable acryl beads MX300 (manufactured and sold by Soken Chemical & Engineering Co., Ltd.) | 10 parts by weight |

Comparative Example 3

An anti-glare film was obtained similarly to as described in Example 2, except that the dry thickness of the anti-glare layer was adjusted to 7 μm.

Example 6

First, a mother die was obtained by the mask imaging method using KrF excimer laser. Next, a metal coverage composed of nickel was formed by electroless plating on the irregular pattern of the obtained mother die. Next, the mother die having the metal film formed thereon was attached to an electroforming apparatus, and a nickel plated layer was formed on the metal coverage by electro-plating. Thereafter, the nickel plated layer was released from the mother die. A duplicate master 22 having an irregular pattern reversed from that of the mother die was obtained in this way.

Next, on the duplicate master obtained as described above, and on the surface thereof having the irregularity formed thereon, a nickel plated layer was formed by electro-plating. Thereafter, the nickel plated layer was released from the duplicate master. A duplicate master having irregularities similar to that of the mother die was obtained in this way.

Next, a ultraviolet-curable resin (manufactured and soled by TOAGOSEI Co., Ltd, Aronix) was poured onto the duplicate master, a PET film (manufactured and sold by TOYOBO Co., Ltd., Cosmoshine A4300) of 75 μm thick was stacked thereon, and the stack was applied with a 1-kg load using a rubber roller, so as to make the thickness uniform. Next, ultraviolet radiation at an energy of 500 mJ/cm$^2$ was irradiated through the PET film, to thereby cure the ultraviolet-curable resin. Thereafter, the cured ultraviolet-curable resin was released, so that a PET film having an anti-glare layer of 5 μm thick formed thereon was obtained. The desired anti-glare film was obtained in this way.

The dry thickness of the anti-glare layers in Examples 1 to 6 and Comparative Examples 1 to 3 were measured using a thickness gauge (manufactured and sold by TESA).

(Evaluation of Roughness)

Surface roughness of each of the anti-glare films obtained as described in Examples 1 to 9 and Comparative Examples 1 to 3 was measured, a roughness curve was acquired from a two-dimensional sectional curve, and arithmetic mean roughness Ra, root mean square roughness RΔq of the roughness curves, and mean length RSm of contour curve components were calculated as roughness parameters. Results are shown in Table 1. The measurement was made under conditions conforming to JIS B0601:2001. The apparatus and conditions for the measurement are shown below:

Measuring instrument: full-automatic micro profiler "Surfcoder ET4000A" (from Kosaka Laboratory, Ltd.) λc=0.8 mm, length of evaluation=4 mm, cutoff×5, data sampling intervals=0.5 μm (Measurement of Haze)

Surface haze and internal haze of the anti-glare films of Examples 1 to 9 and Comparative Examples 1 to 3 were measured. Results are shown in Table 1. Total haze herein means summation of the surface haze and the internal haze.

Instruments for evaluation: Haze meter model HM-150, from Murakami Color Research Laboratory Co., Ltd.

Conditions for measurement: JIS K7136

(Degree of White Muddiness)

Degree of white muddiness in the anti-glare films of Examples 1 to 9 and Comparative Examples 1 to 3 was measured. Results were shown in Table 1. The appearance of white muddiness is perceived by detecting reflected light scattered on the surface of the anti-glare layer. In this measurement, the above-described phenomenon was reproduced in a simulative manner, quantified using a commercially available spectrophotometer, and thus-obtained value was defined as degree of white muddiness. The present inventors have preliminarily confirmed from our experiments that the degree of white muddiness obtained in this measurement were correlative to the appearance of white muddiness on visual perception.

Specific methods of measuring the degree of white muddiness will be shown below. First, in order to evaluate diffuse reflection on the anti-glare film per se, while suppressing influence of reflection on the back surface, a black glass was bonded to the back surface of thus-obtained, anti-glare film while placing an pressure-sensitive adhesive in between. Next, using an integrating-sphere-type spectrophotometer SP64 from X-Rite GmbH, scattered light was irradiated on the surface of the samples, and reflected light was measured using a d/8° optical system using a detector disposed 8° away from the normal line on the samples. The measurement was made based on the SPEX mode detecting only diffusive reflection components, while excluding mirror-reflected components, at an angle of view for detection of 2°.

On the other hand, a black acrylic sheet (Acrylite L 502 manufactured and sold by Mitsubishi Rayon Co., Ltd.) was bonded to the back surface of each of the anti-glare films of Examples 1 to 9 and Comparative Examples 1 to 3, while placing a pressure-sensitive adhesive in between, and the degree of white muddiness was measured by a method similar to that allowing the measurement through the black glass. Results are shown in FIG. 1. It is to be noted that the value obtained only through the black acrylic sheet, having no anti-glare film bonded thereto, was found to be 0.2.

As described in the above, it is confirmed that the degree of white muddiness obtained by this measurement showed correlation to the appearance of white muddiness on visual perception, wherein the appearance of white muddiness was perceived if the value (Y value) measured under the above-described conditions for measurement exceeded 1.5%, became smaller in the range of 1.5% or smaller, and was hardly perceived in the range of 0.8% or smaller.

(Anti-Glare Properties)

The anti-glare properties of the anti-glare films of Examples 1 to 9 and Comparative Examples 1 to 3 were evaluated. More specifically, naked fluorescent lamps were projected on each anti-glare film, and degree of diffusion of the reflected image was evaluated according to the criteria below. Results are shown in Table 1.

A: Contours of the fluorescent lamps not visible (two fluorescent lamps looks like a single one);

B: Fluorescent lamps may be visible to some degree, but with blurred contours; and C: Fluorescent lamps are projected as they are.

(State of Particles)

Figure 15:
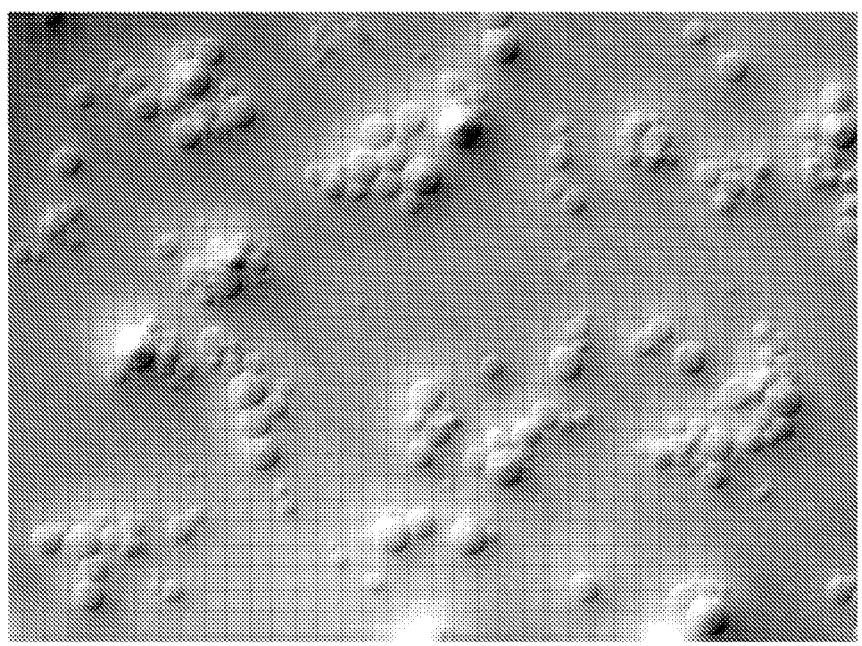
FIG. 15 is a surface photograph showing an exemplary state of agglomeration of the particles in the anti-glare films of Examples 1 to 9.

The surface of each anti-glare film was observed under a laser microscope and an optical microscope, so as to evaluate state of the particles. Results are shown in Table 1. On the other hand, an exemplary state of agglomeration of the particles in the anti-glare films of Examples 1 to 9 is shown in FIG. 15.

It is to be noted herein that "two-dimensional agglomeration" and "dispersion" in Table 1 mean the evaluations below:

Two-dimensional agglomeration: almost all particles agglomerate in the in-plane direction of the anti-glare layers; and Dispersion: the particles are dispersed, and distributed over the entire surface of the anti-glare layer without causing gaps.

TABLE 1

| | | PREFERABLE RANGE | EXAMPLE 1 | EXAMPLE 2 | EXAMPLE 3 | EXAMPLE 4 | EXAMPLE 5 | EXAMPLE 6 |
|---|---|---|---|---|---|---|---|---|
| FILLER | SPECIES | — | CROSS-LINKABLE STYRENE | CROSS-LINKABLE STYRENE | CROSS-LINKABLE STYRENE | CROSS-LINKABLE STYRENE | CROSS-LINKABLE STYRENE | NONE |
| | MEAN PARTICLE SIZE (μm) | — | 6 | 6 | 6 | 6 | 6 | — |
| | RATIO (%) | 40-75 | 60 | 75 | 40 | 66 | — | — |
| | VARIATION COEFFICIENT (%) | 20-40 | 30 | 30 | 30 | 30 | 30 | — |
| | AMOUNT OF ADDITION (PARTS BY WEIGHT) | — | 5 | 5 | 10 | 5 | 5 | — |
| CONFIGURATION | LAYER | — | SINGLE ANTI-GLARE LAYER | SINGLE ANTI-GLARE LAYER | DOUBLE LAYER (FINE PARTICLES | SINGLE ANTI-GLARE LAYER | ANTI-GLARE LAYER + LOW- | SINGLE ANTI-GLARE LAYER |

TABLE 1-continued

|  |  |  |  |  |  | CONTAINED ONLY IN LOWER LAYER) |  | REFRACTIVE-INDEX LAYER |
|---|---|---|---|---|---|---|---|---|
|  | THICKNESS OF ANTI-GLARE LAYER (μm) | 3-30 | 10 | 8 | 15 | 9 | — | 5 |
|  | STATE OF FINE PARTCLES | — | TWO-DIMEN-SIONAL AGGLOM-ERATION | TWO-DIMEN-SIONAL AGGLOM-ERATION | TWO-DIMEN-SIONAL AGGLOM-ERATION | TWO-DIMEN-SIONAL AGGLOM-ERATION | TWO-DIMEN-SIONAL AGGLOM-ERATION | — |
| BASE SURFACE ROUGHNESS | SPECIES | — | TAC | TAC | TAC | PET | TAC | PET |
|  | RΔq (μm) | 0.003-0.05 (0.005-0.03) | 0.030 | 0.047 | 0.009 | 0.030 | 0.020 | 0.003 |
|  | Ra (μm) | 0.05-0.5 (0.1-03) | 0.30 | 0.48 | 0.16 | 0.30 | 0.23 | 0.08 |
|  | RSm (mm) | — | 0.102 | 0.105 | 0.24 | 0.102 | 0.1 | 0.2 |
| OPTICAL PROPERTIES | DEGREE OF WHITE MUDDINESS A | up to 2 (05-15) | 1.4 | 2.0 | 0.9 | 1.4 | 0.5 | 0.6 |
|  | DEGREE OF WHITE MUDDINESS B | up to 1.5 (0.4-1.1) | 1.1 | 1.5 | 0.7 | 1.1 | 0.4 | 0.5 |
|  | ANTI-GLARE PERFORMANCE | 70-92 (72-90) | B | A | B | B | B | A |
| HAZE (%) | TOTAL | up to 45 | 14.8 | 16.4 | 40.2 | 14.8 | 14.8 | 0 |
|  | INTERNAL | — | 14.6 | 13.8 | 37.4 | 14.6 | 14.6 | 0 |
|  | SURFACE | 0-5(0-1) | 0.2 | 2.6 | 2.8 | 0.2 | 0.2 | 0 |

|  |  |  | EXAMPLE 7 | EXAMPLE 8 | EXAMPLE 9 | COMPARATIVE EXAMPLE 1 | COMPARATIVE EXAMPLE 2 | COMPARATIVE EXAMPLE 3 |
|---|---|---|---|---|---|---|---|---|
|  | FILLER | SPECIES | CROSS-LINKABLE ACRYLIC | CROSS-LINKABLE ACRYLIC | SILICA | CROSS-LINKABLE STYRENE | CROSS-LINKABLE ACRYLIC | CROSS-LINKABLE ACRYLIC |
|  |  | MEAN PARTICLE SIZE(μm) | 5 | 1.5 | 1 | 6 | 3 | 3 |
|  |  | RATIO (%) | 33 | 50 | 16 | 85 | 75 | 43 |
|  |  | VARIATION COEFFICIENT (%) | 30 | 30 | — | 30 | 30 | 30 |
|  |  | AMOUNT OF ADDITION (PARTS BY WEIGHT) | 3 | 3 | 10 | 5 | 10 | 10 |
|  | CONFIGURATION | LAYER | DOUBLE LAYER (FINE PARTICLES CONTAINED ONLY IN LOWER LAYER) | SINGLE ANTI-GLARE LAYER | SINGLE ANTI-GLARE LAYER | SINGLE ANTI-GLARE LAYER | SINGLE ANTI-GLARE LAYER | SINGLE ANTI-GLARE LAYER |
|  |  | THICKNESS OF ANTIGLARE LAYER (μm) | 15 | 3 | 6 | 7 | 4 | 7 |
|  |  | STATE OF FINE PARTCLES | TWO-DIMEN-SIONAL AGGLOM-ERATION | TWO-DIMEN-SIONAL AGGLOM-ERATION | TWO-DIMEN-SIONAL AGGLOM-ERATION | TWO-DIMEN-SIONAL AGGLOM-ERATION | DISPERSION | DISPERSION |
|  | BASE SURFACE ROUGHNESS | SPECIES | TAC | TAC | TAC | TAC | TAC | TAC |
|  |  | RΔq (μm) | 0.003 | 0.024 | 0.0104 | 0.089 | 0.015 | 0.099 |
|  |  | Ra (μm) | 0.05 | 0.237 | 0.097 | 0.71 | 0.04 | 0.32 |
|  |  | RSm (mm) | 0.16 | 0.3 | 0.172 | 0.11 | 0.136 | 0.063 |
|  | OPTICAL PROPERTIES | DEGREE OF WHITE MUDDINESS A | 0.7 | 1.3 | 1.2 | 3.6 | 0.95 | 4.15 |
|  |  | DEGREE OF WHITE MUDDINESS B | 0.6 | 1.0 | 1.0 | 2.8 | 0.8 | 3.3 |
|  |  | ANTI-GLARE PERFORMANCE | B | A | A | A | C | A |

TABLE 1-continued

| | | | | | | | |
|---|---|---|---|---|---|---|---|
| HAZE (%) | TOTAL | 4 | 2.4 | 7.6 | 19.3 | 8.7 | 21.1 |
| | INTERNAL | 3.6 | 2.4 | 6.6 | 14.6 | 8.7 | 17.5 |
| | SURFACE | 0.4 | 0 | 1.0 | 4.7 | 0 | 3.6 |

TAC: Triacetyl celluloseDegree of white muddiness
PET: Polyethylene terephthalateDegree of white muddiness
RΔq: Root mean square slope
Ra: Arithmetic mean roughness
RSm: Mean length of contour curve component
A: Degree of white muddiness measured through bonded black glass
B: Degree of white muddiness measured through bonded black acryl sheet
Ratio R: r/d × 100 (where, r: mean particle size of particles, d: thickness of anti-glare layer)

Coefficient of variation is not shown for Example 9, because silica used as the particles have irregular shapes.

Table 1 teaches the followings.

The anti-glare films of Example 1 to 9 have arithmetic mean roughness Ra of the roughness curves of 0.05 to 0.5, root mean square slope RΔq of 0.003 to 0.05, and haze of 0 to 5, proving excellence both in the anti-glare properties and the degree of white muddiness. In contrast, the anti-glare film of Comparative Example 1 shows arithmetic mean roughness Ra of the roughness curve, root mean square slope RΔq, and haze, all of which exceed the above-described numerical ranges, and whereby the degree of white muddiness becomes large. The anti-glare film of Comparative Example 2 shows the arithmetic mean roughness Ra of the roughness curve out of the above-described numerical range, showing poor anti-glare properties. The anti-glare film of Comparative Example 3 has the arithmetic mean roughness Ra of the roughness curve fallen within the above-described range, but has the root mean square slope RΔq exceeding the above-described numerical range, showing increased degree of white muddiness.

Figure 6:
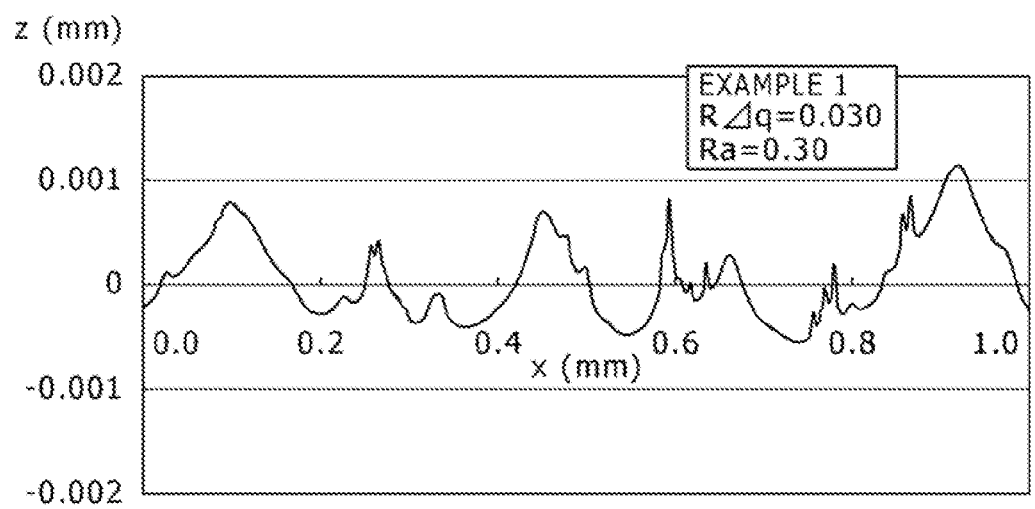
FIG. 6 is a graph showing a roughness curve in Example 1.
Figure 7:
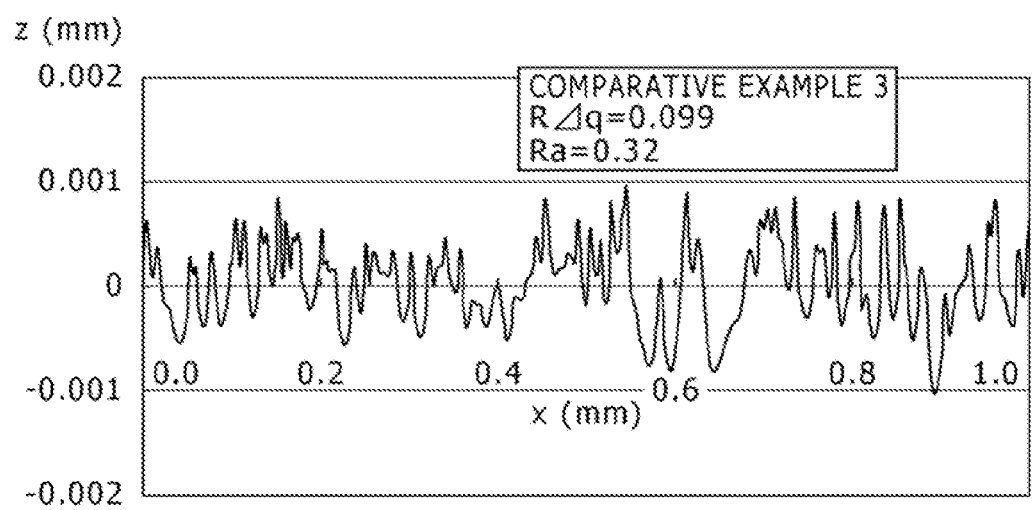
FIG. 7 is a graph showing a roughness curve in Comparative Example 3.

FIG. 6 shows a roughness curve determined based on the two-dimensional sectional curve in Example 1. FIG. 7 shows a roughness curve determined based on the two-dimensional sectional curve in Comparative Example 3. Example 1 and Comparative Example 3 agree in that they have almost same values for the arithmetic mean roughness Ra of the roughness curve, fallen in the range from 0.05 to 0.5, but differ in the root mean square slope RΔq, wherein Example 1 falls in the range from 0.003 to 0.05, whereas Comparative Example 3 falls out of the range from 0.003 to 0.05. Comparison of the degree of white muddiness of the both teaches that Example 1 having the root mean square slope RΔq fallen in the range from 0.003 to 0.05 may successfully obtain small degree of white muddiness and high contrast, whereas Comparative Example 3 having the root mean square slope RΔq out of the range from 0.003 to 0.05 results in large degree of white muddiness and low contrast.

It is made clear from the results shown in the above that it is difficult to suppress degradation of the contrast while keeping a desirable level of anti-glare properties only by controlling the arithmetic mean roughness Ra of the roughness curve in the earlier developed film (inventions described in the Patent Documents 1, 2, for example), and that it is desirable to control both of the arithmetic mean roughness Ra of the roughness curve and the root mean square slope RΔq, in view of realizing high contrast (small degree of white muddiness) while keeping a desirable level of anti-glare properties.

Next, correlation between the degree of white muddiness measured through the bonded black glass sheet, and the degree of white muddiness measured through the bonded acrylic sheet will be explained referring to Table 2 and FIG. 14.

TABLE 2

| | Degree of white muddiness measured through glass sheet (measured) | Degree of white muddiness measured through acrylic sheet (measured) | Degree of white muddiness measured through acrylic sheet (calculated) |
|---|---|---|---|
| Sample 1 | 2.6 | 2.3 | 2.3 |
| Sample 2 | 2.0 | 1.8 | 1.7 |
| Sample 3 | 0.9 | 0.5 | 0.5 |
| Sample 4 | 0.9 | 0.6 | 0.5 |
| Sample 5 | 1.0 | 0.6 | 0.6 |
| Sample 6 | 1.0 | 0.6 | 0.6 |
| Sample 7 | 1.7 | 1.5 | 1.4 |
| Sample 8 | 1.2 | 0.8 | 0.9 |
| Sample 9 | 1.3 | 0.9 | 1.0 |
| Sample 10 | 1.1 | 0.7 | 0.7 |
| Sample 11 | 1.2 | 0.8 | 0.8 |
| Sample 12 | 1.0 | 0.6 | 0.6 |
| Sample 13 | 1.0 | 0.6 | 0.6 |
| Sample 14 | 0.9 | 0.4 | 0.5 |

Table 2 shows results of measurement of degree of white muddiness measured respectively through the black glass sheet and the black aryl sheet, with respect to the anti-glare films of Sample 1 to Sample 14, obtained by controlling the degree of white muddiness through appropriate adjustment of the film thickness and the grain size in Example 1. Table 2 shows also calculated values of degree of white muddiness measured through the acrylic sheet, using a regression line obtained based on the correlation. It was understood from Table 2 that the calculation may yield values close to the measured values.

Figure 14:
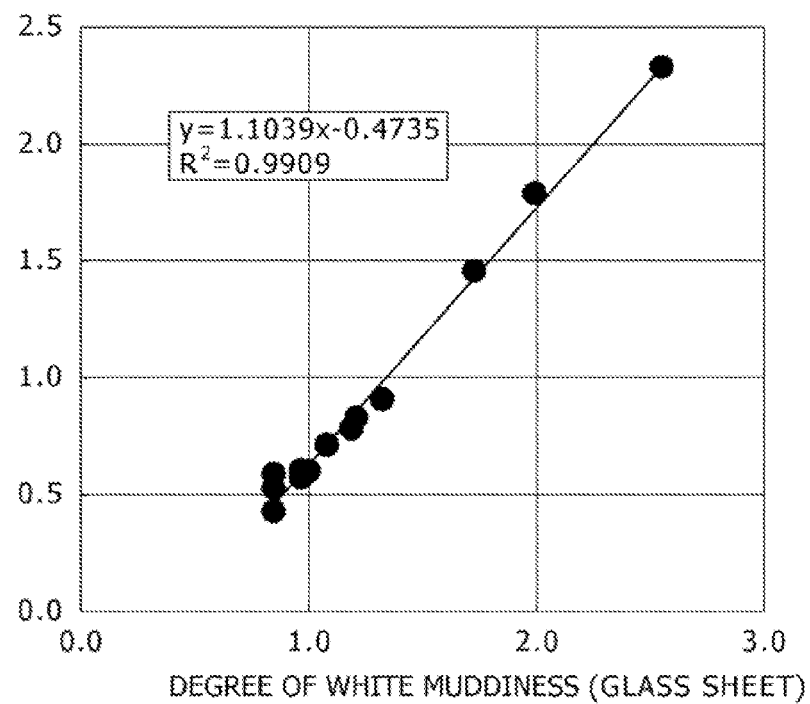
FIG. 14 is a graph explaining correlation between degree of white muddiness measured through a black glass and degree of white muddiness measured through a black acrylic sheet.

The regression line obtained based on the correlation between the results obtained through the black glass sheet and the black acrylic sheet is obtained, as shown in FIG. 14, by plotting the degree of white muddiness measured through the black glass sheet on the abscissa, and the degree of white muddiness measured through the black acrylic sheet on the ordinate. It is understood from FIG. 14 that, assuming the degree of white muddiness measured through the bonded glass sheet as x, and the degree of white muddiness measured through the acrylic sheet as y, a regression line y=1.1039x−0.4735 may be obtained, with a coefficient of determination $R2$ of 0.9909. It may be understood from the facts that there is a strong correlation between the degree of white muddiness measured through the black glass sheet and the degree of white muddiness measured through the black acrylic sheet.

Example 10

Source materials listed in the coating composition below were mixed, and stirred using a magnetic stirrer for one hour, to thereby obtain a coating composition. Next, the obtained coating composition was applied using a bar coater on a TAC film (from FUJIFILM Corporation) of 80 μm thick. The product was then dried in a drying oven at 80° C. for 2 minutes, then ultraviolet radiation was irradiated at an energy of 500 mJ/cm$^2$, to thereby form the anti-glare layer having a dry thickness of 9.5 μm. The desired anti-glare film was obtained in this way.

<Coating Composition>

| | |
|---|---|
| Resin: hexafunctional urethane acryl oligomer | 95 parts by weight |
| Acryl-base polymer | 5 parts by weight |
| Initiator: Irgacure 184 | 4.8 parts by weight |
| Solvent: butyl acetate | 51 parts by weight |
| dimethyl carbonate | 42 parts by weight |
| Particles: acryl-styrene copolymer beads (center grain size = 5.4 μm, coefficient of variation = 31%) | 6 parts by weight |
| n (Refractive index) = 1.56 | |

Example 11

Source materials listed in the coating composition below were mixed, and stirred using a magnetic stirrer for one hour, to thereby obtain a coating composition. Next, the obtained coating composition was applied using a bar coater on a TAC film (manufactured and soled by FUJIFILM Corporation) of 80 μm thick. The product was then dried in a drying oven at 80° C. for 2 minutes, then ultraviolet radiation was irradiated at an energy of 500 mJ/cm$^2$, to thereby form the anti-glare layer having a dry thickness of 10 μm. The desired anti-glare film was obtained in this way.

<Coating Composition>

| | |
|---|---|
| Resin: hexafunctional urethane acryl oligomer | 100 parts by weight |
| Initiator: Irgacure 184 | 5 parts by weight |
| Anti-static agent: Celnax CX-S204 (from Nissan Chemical Industries, Ltd.) | 200 parts by weight |
| Solvent: butyl acetate | 15 parts by weight |
| Particles: acryl-styrene copolymer beads (center grain size = 5.6 μm, coefficient of variation = 31%) | 6 parts by weight |
| n (Refractive index) = 1.555 | |

Example 12

Source materials listed in the coating composition below were mixed, and stirred using a magnetic stirrer for one hour, to thereby obtain a coating composition. Next, thus-obtained coating composition was applied using a bar coater on a TAC film (manufactured and soled by FUJIFILM Corporation) of 80 μm thick. The product was then dried in a drying oven at 80° C. for 2 minutes, then ultraviolet radiation was irradiated at an energy of 500 mJ/cm$^2$, to thereby form the anti-glare layer having a dry thickness of 11 μm. The desired anti-glare film was obtained in this way.

<Coating Composition>

| | |
|---|---|
| Resin: hexafunctional urethane acryl oligomer | 95 parts by weight |
| Acryl-base polymer | 5 parts by weight |
| initiator: Irgacure 184 | 4.75 parts by weight |
| Solvent: butyl acetate | 51 parts by weight |
| dimethyl carbonate | 42 parts by weight |
| Particles: acryl-styrene copolymer beads (center grain size = 5.4 μm, coefficient of variation = 31%) | 6 parts by weight |
| n (Refractive index) = 1.56 | |

Next, a SiOx film of 5 nm thick, a $Nb_2O_5$ film of 10 nm thick, a $SiO_2$ film of 30 nm thick, a $Nb_2O_5$ film of 100 nm thick, and a $SiO_2$ film of 90 nm thick were stacked in this order by sputtering on the anti-glare layer. The multi-layered, anti-reflective layer was thus formed on the anti-glare layer. The desired anti-glare film was obtained in this way.

(Degree of White Muddiness, Anti-Glare Properties, Haze, Particle State)

With respect to the films obtained as described in Examples 10 to 12, the degree of white muddiness, anti-glare properties, haze and particle state were measured similarly to as described in Example 1. Results are shown in Table 3. The degree of white muddiness herein was measured through the bonded black acrylic sheet.

TABLE 3

| | | | Example 10 | Example 11 | Example 12 |
|---|---|---|---|---|---|
| Filler | | Species | Acrylstyrene | Acrylstyrene | Acrylstyrene |
| | | Mean Particle size | 5.4 | 5.6 | 5.4 |
| | | Amount of addition (parts by weight) | 6 | 6 | 6 |
| Configuration | | Layer | Single (anti-glare layer) | Single (anti-glare layer) | Double layer (anti-glare layer/anti-reflective layer) |
| | | Thickness of anti-glare layer (μm) | 9.5 | 10 | 11 |
| Base | | Species | TAC | TAC | TAC |
| Surface Roughness | | RΔq (μm) | 0.020 | 0.023 | 0.016 |
| | | Ra (μm) | 0.18 | 0.24 | 0.14 |
| | | RSm (mm) | 0.250 | 0.440 | 0.129 |
| Optical properties | | Degree of white muddiness | 0.7 | 0.7 | 0.1 |
| | | Anti-glare properties | B | B | A |
| | Haze (%) | Total | 6.6 | 6.0 | 6.6 |
| | | Internal | 4.6 | 4.1 | 4.6 |
| | | Surface | 2.0 | 1.9 | 2.0 |

TABLE 3-continued

|  | Example 10 | Example 11 | Example 12 |
|---|---|---|---|
| Mean particle size/thickness of anti-glare layer (%) | 56.8 | 56.0 | 49.1 |
| Coefficient of variation | 31 | 31 | 31 |
| State of Grain size distribution | Mainly two-dimensional agglomeration | Mainly two-dimensional agglomeration | Mainly two-dimensional agglomeration |

Table 3 teaches the followings.

While the anti-glare films of Examples 10, 11 shows a degree of white muddiness of 0.7, the anti-glare film of Example 12 shows a degree of white muddiness of 0.1. The anti-glare films of Examples 10, 11 are evaluated as "B", the anti-glare properties of Example 12 was evaluated as "A".

It is therefore concluded that provision of the anti-reflective film on the anti-glare layer may further lower the degree of white muddiness, and may further improve the anti-glare properties.

The embodiments and Examples of the present application have specifically been described. The present application is, however, by no means limited to the above-described embodiments and Examples, allowing various modifications based on the technical spirit of the present application.

For example, numerical values exemplified in the above-described embodiments and Examples are merely for explanatory purpose, so that any numerical values different therefrom may be used as occasions demand.

The individual configurations of the above-described embodiments may be combined with each other, without departing from the spirit of the present application.

In the above-described embodiments, a low refractive index layer having a refractive index smaller than that of the anti-glare layer 12 may be provided on the anti-glare layer 12. Materials composing the low refractive index layer adoptable herein may include fluorine (F)-containing photosensitive resin and so forth. Provision of the low refractive index layer may desirably lower reflection on the surface of the anti-glare layer 12, and may impart anti-fouling property to the surface of the anti-glare layer.

Although the above-described embodiments dealt with the cases where the mother die was manufactured by processing an object to be processed by the mask imaging method using KrF excimer layer, the method of manufacturing the mother die is not limited thereto, allowing any methods so far as desired surface profile may be obtained. For example, the mother die may be manufactured by any methods based on pressing or those making use of a stamper for forming, cutting, or blasting.

Although the above-described embodiments dealt with the cases where the anti-glare film was formed using the ionizing radiation-curable resin curable by ultraviolet radiation or the like, the anti-glare layer may be formed by using ionizing radiation-curable resin curable by electron beam or the like. It is still also allowable to form the anti-glare layer using a thermosetting resin.

Although the above-described embodiments dealt with the cases where the anti-glare film was applied to the liquid crystal display device, examples of application of the anti-glare film are not limited thereto. For example, the film may be adoptable to various display devices such as plasma display, electroluminescence display, CRT (cathode ray tube) and so forth.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. An anti-glare film, comprising:
   a base; and
   at least one anti-glare layer provided on the base,
   wherein irregularities of the anti-glare layer are formed by applying a coating composition containing organic particles having a mean particle size of 1 to 10 micrometers on the base and causing convection generated in the coating composition so that the particles are agglomerated in an in-plane direction of the anti-glare layer, and at least substantially all of the agglomerated particles are agglomerated in the in-plane direction of the anti-glare layer and do not overlap each other in a thickness direction of the anti-glare layer, and any residual particles that do overlap with each other in the thickness direction are limited in number so as to not cause an increase in the degree of white muddiness of the anti-glare film,
   ratio R is defined by r/d×100, the ratio R is 40% to 75%, d being a thickness of the anti-glare layer, r being a mean particle size of the particles,
   arithmetic mean roughness Ra of a roughness curve of the surface of the anti-glare layer is 0.05 to 0.5 micrometers, and root mean square slope RΔq is 0.003 to 0.05,
   wherein the particles have a particle size distribution expressed by a coefficient of variation (standard deviation/mean particle size) of 20 to 40%, and
   wherein the particle size distribution and a degree of agglomeration of the particles caused by the convection is set such that the root mean square slope RΔq of the anti-glare layer after the agglomeration is less than the root mean square slope RΔq of the anti-glare layer before the agglomeration.

2. The anti-glare film as claimed in claim 1, wherein all of the particles agglomerate in the in-plane direction without being overlapped with each other in the thickness direction of the anti-glare layer.

3. The anti-glare film as claimed in claim 1, wherein the anti-glare layer contains an ionizing radiation-curable resin or a thermosetting resin, and
   the fine irregularities are provided on a surface of the anti-glare layer.

4. The anti-glare film as claimed in claim 1,
   wherein the agglomeration is covered with the resin on a surface of the anti-glare layer.

5. The anti-glare film as claimed in claim 1, further containing inorganic particles.

6. The anti-glare film as claimed in claim 1, further comprising a low refractive index layer formed on the anti-glare layer, the low refractive index layer having a refractive index lower than that of the anti-glare layer.

7. The anti-glare film as claimed in claim 1, having a total haze of 40% or smaller, and a surface haze of 0 to 5%.

8. The anti-glare film as claimed in claim 1, having a degree of white muddiness of 1.5 or smaller.

9. The anti-glare film as claimed in claim 1, wherein Benard Cells are formed on the surface.

10. The anti-glare film as claimed in claim 9, wherein a meniscus is formed Benard Cells therebetween.

11. A display device comprising:
- a display portion for displaying an image; and
- an anti-glare film provided on a display side of the display portion,
- wherein the anti-glare film comprises:
- a base; and
- at least one anti-glare layer provided on the base,
- wherein irregularities of the anti-glare layer are formed by applying a coating composition containing organic particles having a mean particle size of 1 to 10 micrometers on the base and causing convection generated in the coating composition so that the particles are agglomerated in an in-plane direction of the anti-glare layer, and at least substantially all of the agglomerated particles are agglomerated in the in-plane direction of the anti-glare layer and do not overlap each other in a thickness direction of the anti-glare layer, and any residual particles that do overlap with each other in the thickness direction are limited in number so as to not cause an increase in the degree of white muddiness of the anti-glare film,
- ratio R is defined by r/d×100, the ratio R is 40% to 75%, d being a thickness of the anti-glare layer, r being a mean particle size of the particles,
- arithmetic mean roughness Ra of a roughness curve of the surface of the anti-glare layer is 0.05 to 0.5 micrometers, and root mean square slope RΔq is 0.003 to 0.05,
- wherein the particles have a particle size distribution expressed by a coefficient of variation (standard deviation/mean particle size) of 20 to 40%, and
- wherein the particle size distribution and a degree of agglomeration of the particles caused by the convection is set such that the root mean square slope RΔq of the anti-glare layer after the agglomeration is less than the root mean square slope RΔq of the anti-glare layer before the agglomeration.

12. The display device as claimed in claim 11, wherein all of the particles agglomerate in the in-plane direction without being overlapped with each other in the thickness direction of the anti-glare layer.

* * * * *